(12) United States Patent
Kimura et al.

(10) Patent No.: US 12,158,436 B2
(45) Date of Patent: Dec. 3, 2024

(54) SCATTERING TOMOGRAPHY DEVICE AND SCATTERING TOMOGRAPHY METHOD

(71) Applicant: Integral Geometry Science Inc., Hyogo (JP)

(72) Inventors: Kenjiro Kimura, Hyogo (JP); Noriaki Kimura, Hyogo (JP)

(73) Assignee: INTEGRAL GEOMETRY SCIENCE INC., Hyogo (JP)

( * ) Notice: Subject to any disclaimer, the term of this patent is extended or adjusted under 35 U.S.C. 154(b) by 545 days.

(21) Appl. No.: 17/625,844

(22) PCT Filed: Jul. 28, 2020

(86) PCT No.: PCT/JP2020/028880
§ 371 (c)(1),
(2) Date: Jan. 10, 2022

(87) PCT Pub. No.: WO2021/020387
PCT Pub. Date: Feb. 4, 2021

(65) Prior Publication Data
US 2022/0268711 A1 Aug. 25, 2022

(30) Foreign Application Priority Data

Aug. 1, 2019 (JP) .................................. 2019-142379

(51) Int. Cl.
*G06K 9/00* (2022.01)
*G01N 22/00* (2006.01)
*G06T 11/00* (2006.01)

(52) U.S. Cl.
CPC ............ *G01N 22/00* (2013.01); *G06T 11/003* (2013.01); *G06T 11/005* (2013.01)

(58) Field of Classification Search
None
See application file for complete search history.

(56) References Cited

U.S. PATENT DOCUMENTS

| 4,805,627 A | 2/1989 | Klingenbeck et al. |
| 2006/0241409 A1 | 10/2006 | Winters et al. |

(Continued)

FOREIGN PATENT DOCUMENTS

| JP | 62-66145 | 3/1987 |
| WO | 2014/125815 | 8/2014 |
| WO | 2015/136936 | 9/2015 |

OTHER PUBLICATIONS

Extended European Search Report issued Jul. 17, 2023 in European Application No. 20847008.8.

(Continued)

*Primary Examiner* — Sj Park
(74) *Attorney, Agent, or Firm* — WENDEROTH, LIND & PONACK, L.L.P.

(57) ABSTRACT

A scattering tomography device includes: a transmitting antenna element that transmits radio waves into an object from outside; a receiving antenna element that receives, outside the object, scattered waves of the radio waves transmitted into the object; and an information processing circuit that generates an image of the interior of the object using measurement data indicating the scattered waves received by the receiving antenna element. The information processing circuit: derives, using the measurement data, a relational expression that satisfies an equation whose solution is a scattering field function; derives, using the relational expression, an image function that is for generating the image and includes one or more parameters indicating a correspondence between a change in frequency of the radio waves and a change in a dielectric constant of the object in accordance with Debye relaxation; and generates the image using the image function.

16 Claims, 19 Drawing Sheets

(56) References Cited

U.S. PATENT DOCUMENTS

2015/0377778 A1* 12/2015 Kimura .............. G01N 29/0672
                                                                                         702/189
2016/0377557 A1    12/2016  Kimura et al.
2019/0021626 A1    1/2019  Cano Garcia et al.

OTHER PUBLICATIONS

Yoshihiko, Kuwahara, "Chapter 4 Microwave Mammography Technology that Avoids the Risk of x-ray Exposure and Realizes Safe and Reliable Breast Cancer Screening", RF World, CQ Publishing, JP, Feb. 2014, vol. 25, pp. 42-53 (with partial English translation).
International Search Report issued Oct. 13, 2020 in International (PCT) Application No. PCT/JP2020/028880.

* cited by examiner

FIG. 11

SCATTERING TOMOGRAPHY DEVICE AND SCATTERING TOMOGRAPHY METHOD

TECHNICAL FIELD

The present disclosure relates to a scattering tomography device and the like that generates an image of the interior of an object using scattered waves of radio waves.

BACKGROUND ART

Patent Literature (PTL) 1, PTL 2, and PTL 3 disclose techniques related to a scattering tomography device and the like that generates an image of the interior of an object using scattered waves of radio waves.

For example, with the technique described in PTL 1, a beam transmitted out from a microwave transmitter is incident on an inspection target, and the amplitude and phase of scattered beams are detected by a microwave detector. A distribution of the dielectric constant is then computed from the output signal of the microwave detector, and a section of the inspection object is imaged.

CITATION LIST

Patent Literature

[PTL 1] Japanese Unexamined Patent Application Publication No. S62-66145
[PTL 2] WO 2014/125815
[PTL 3] WO 2015/136936

SUMMARY OF INVENTION

Technical Problem

Unfortunately, it is not easy to generate a highly accurate image of the interior of an object using scattered waves of radio waves such as microwaves.

More specifically, when the state of the interior of an object is known, calculating measurement data, which is the data measured as scattered waves relative to radio waves incident on the object, is easy as it is a forward problem. However, calculating the state of the interior of an object when the measurement data is known is difficult as it is an inverse problem.

Radio waves incident on an object may contain a large number of frequency components. Different radio wave frequencies result in different dielectric constants in the object and different radio wave propagation speeds. Stated differently, radio waves are characterized by a plurality of propagation speeds corresponding to the plurality of frequency components. Because the measurement data is affected by this, it is difficult to calculate the state of the interior of an object from the measurement data.

In view of this, the present disclosure provides a scattering tomography device and the like that can generate a highly accurate image of the interior of an object using scattered waves of radio waves.

Solution to Problem

A scattering tomography device according to one aspect of the present disclosure includes: a transmitting antenna element that transmits radio waves into an interior of an object from outside the object; a receiving antenna element that receives, outside the object, scattered waves of the radio waves transmitted into the interior of the object; and an information processing circuit that generates an image of the interior of the object using measurement data indicating the scattered waves received by the receiving antenna element.

The information processing circuit: derives, using the measurement data, a relational expression that satisfies an equation whose solution is a scattering field function that takes a transmission position of the radio waves and a reception position of the scattered waves as inputs and outputs an amount of the scattered waves at the reception position; derives, using the relational expression, an image function that is for generating the image and includes one or more parameters indicating a correspondence between a change in frequency of the radio waves and a change in a dielectric constant of the object in accordance with Debye relaxation; and generates the image using the image function.

These general or specific aspects may be implemented as a system, a device or apparatus, a method, an integrated circuit, a computer program, or a non-transitory computer-readable recording medium such a CD-ROM, or any combination thereof.

Advantageous Effects of Invention

According to one aspect of the present disclosure, it is possible to generate a highly accurate image of the interior of an object using scattered waves of radio waves.

BRIEF DESCRIPTION OF DRAWINGS

FIG. 11 illustrates measurement points in the scanning method performed by the antenna array according to an embodiment of the present disclosure.

DESCRIPTION OF EMBODIMENTS

Figure 1:
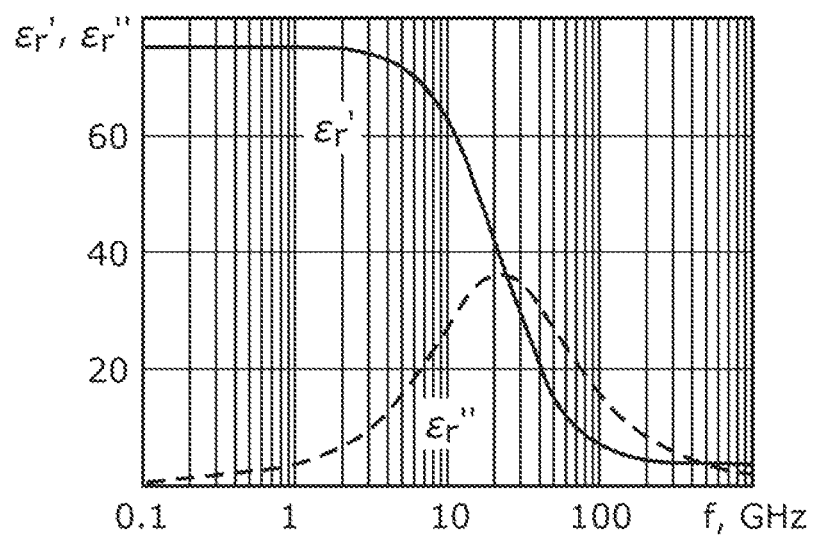
FIG. 1 is a graph illustrating the frequency dependence of the dielectric constant and the Debye relaxation of water at 30° C. according to an embodiment of the present disclosure.

A scattering tomography device according to one aspect of the present disclosure includes: a transmitting antenna element that transmits radio waves into an interior of an object from outside the object; a receiving antenna element that receives, outside the object, scattered waves of the radio waves transmitted into the interior of the object; and an information processing circuit that generates an image of the interior of the object using measurement data indicating the scattered waves received by the receiving antenna element. The information processing circuit: derives, using the measurement data, a relational expression that satisfies an equation whose solution is a scattering field function that takes a transmission position of the radio waves and a reception position of the scattered waves as inputs and outputs an amount of the scattered waves at the reception position; derives, using the relational expression, an image function that is for generating the image and includes one or more parameters indicating a correspondence between a change in frequency of the radio waves and a change in a dielectric constant of the object in accordance with Debye relaxation; and generates the image using the image function.

This enables the scattering tomography device to derive a relational expression for deriving an image function based on the scattering field function, which indicates the amount of scattered waves depending on the transmission position and the reception position, and the measurement data of the scattered waves received by the receiving antenna element. In addition, the image function includes one or more parameters that indicate the correspondence between a change in frequency of the radio waves and a change in the dielectric constant of the object. Accordingly, the correspondence between a change in frequency and a change in the dielectric constant can be reflected in the generation of an image showing the interior of an object by the scattering tomography device.

In other words, the scattering tomography device can generate a highly accurate image of the interior of an object using scattered waves of radio waves.

For example, in a three-dimensional space of X coordinates, Y coordinates, and Z coordinates, an X coordinate of a position of the transmitting antenna element is identical to an X coordinate of a position of the receiving antenna element, and the scattering field function is defined as:

$$\phi(x, y_1, y_2, z_1, z_2, \omega) = \iint_D \int \frac{e^{ik\rho_1}}{\rho_1} \frac{e^{ik\rho_2}}{\rho_2} \varepsilon(\xi, \eta, \zeta) d\xi d\eta d\zeta \quad \text{[Math. 1]}$$

$$\rho_1 = \sqrt{(x-\xi)^2 + (y_1-\eta)^2 + (z_1-\zeta)^2}$$

$$\rho_2 = \sqrt{(x-\xi)^2 + (y_2-\eta)^2 + (z_2-\zeta)^2}$$

where x is an X coordinate of the transmission position and the reception position, $y_1$ is a Y coordinate of the transmission position, $y_2$ is a Y coordinate of the reception position, $z_1$ is a Z coordinate of the transmission position, $z_2$ is a Z coordinate of the reception position, ω is an angular frequency of the radio waves, D is a region including matter that generates the scattered waves by reflecting the radio waves, ξ is an X coordinate of a position in the region, η is a Y coordinate of the position in the region, ζ is a Z coordinate of the position in the region, ε(ξ, η, ζ) is a reflectivity, i is an imaginary unit, and k is a wavenumber of the radio waves.

This allows the scattering tomography device to properly derive a relational expression for deriving an image function based on the scattering field function described above, which is defined based on the X coordinate of the position of the transmitting antenna element being the same as the X coordinate of the position of the receiving antenna element.

For example, the equation is defined as:

$$\left[\frac{1}{4}\Delta_5^2 - (ik)^2 \partial_x^2 - (\partial_{y_1}^2 + \partial_{z_1}^2)(\partial_{y_2}^2 + \partial_{z_2}^2)\right]\phi = 0 \quad \text{[Math. 2]}$$

$$\Delta_5 = \partial_x^2 + \partial_{y_1}^2 + \partial_{y_2}^2 + \partial_{z_1}^2 + \partial_{z_2}^2.$$

This allows the scattering tomography device to properly derive the relational expression for deriving the image function based on the above partial differential equation, which is defined as an equation whose solution is the above scattering field function.

For example, the relational expression is defined as:

$$\phi(x, y_1, y_2, z_1, z_2, k) = \frac{1}{(2\pi)^3} \int_{-\infty}^{\infty} \int_{-\infty}^{\infty} \int_{-\infty}^{\infty}$$ [Math. 3]

$$e^{-i(k_x x + k_{y_1} y_1 + k_{y_2} y_2)} a(k_x, k_{y_1}, k_{y_2}, k)$$

$$e^{is_1(k_x, k_{y_1}, k_{y_2})z_1} e^{is_2(k_x, k_{y_1}, k_{y_2})z_2} dk_x dk_{y_1} dk_{y_2}$$

where $k_x$ is a wavenumber related to x in the scattering field function, $k_{y_1}$ is a wavenumber related to $y_1$ in the scattering field function, and $k_{y_2}$ is a wavenumber related to $y_2$ in the scattering field function, $a(k_x, k_{y_1}, k_{y_2}, k)$ is defined as:

$$a(k_x, k_{y_1}, k_{y_2}, k) = \sum_{I,J} a_{I,J}(k_x, k_{y_1}, k_{y_2}, k)$$ [Math. 4]

$$= \sum_{I,J} e^{i(k_{y_1} y_I + k_{y_2} y_J)} e^{-is_1(k, k_x, k_{y_1}, k_{y_2})z_I}$$

$$e^{-is_2(k, k_x, k_{y_1}, k_{y_2})z_J} \Phi(k_x, y_I, y_J, k)$$

where I is an index of the transmission position at which the transmitting antenna element is present, J is an index of the reception position at which the receiving antenna element is present, $y_I$ is a Y coordinate of the transmission position at which the transmitting antenna element is present, $y_J$ is a Y coordinate of the reception position at which the receiving antenna element is present, $a_{I,J}(k_x, k_{y_1}, k_{y_2}, k)$ is a coefficient defined by the measurement data at $k_x$, $k_{y_1}$, $k_{y_2}$, and k, and $\phi(k_x, y_I, y_J, k)$ is the measurement data at $k_x$, $y_I$, $y_J$, and k.

This allows the scattering tomography device to properly derive the image function based on the above relational expression, which is defined by the measurement data corresponding to the transmission position at which the transmitting antenna element is present and the reception position at which the receiving antenna element is present.

For example, the image function is defined as:

$$\rho(x, y, z) = \int_{-\infty}^{\infty} \lim_{y_1 \to y, y_2 = y} [\phi(x, y_1, y_2, z, k)] d\omega$$ [Math. 5]

$$= \int_{-\infty}^{\infty} \frac{1}{(2\pi)^3} \int_{-\infty}^{\infty} \int_{-\infty}^{\infty} \int_{-\infty}^{\infty} e^{-i(k_x x + k_{y_1} y + k_{y_2} y)}$$

$$e^{ik_z z} a(k_x, k_{y_1}, k_{y_2}, k) \left(\frac{dk}{dk_z}\right)\left(\frac{d\omega}{dk}\right) dk_x dk_{y_1} dk_{y_2} dk_z$$

where x in the image function is an X coordinate of the image, y in the image function is a Y coordinate of the image, and z in the image function is a Z coordinate of the image, and variables included in an integrand in the image function are defined as:

$$k_z = \sqrt{\left(\sqrt{k^2 - k_{y_1}^2} + \sqrt{k^2 - k_{y_2}^2}\right)^2 - k_x^2}$$ [Math. 6]

$$k = \frac{1}{2}\sqrt{k_x^2 + k_z^2 + \frac{(k_{y_1}^2 - k_{y_2}^2)^2}{k_x^2 + k_z^2} + 2(k_{y_1}^2 - k_{y_2}^2)}$$

$$\frac{dk}{dk_z} = \frac{k_z \sqrt{k^2 - k_{y_1}^2} + \sqrt{k^2 - k_{y_2}^2}}{k(k_x^2 + k_z^2)}$$

$$\omega = \sqrt{\frac{-(a + b - c_0^2 \alpha k^2) + \sqrt{(a + b - c_0^2 \alpha k^2)^2 + 4a\alpha c_0^2 k^2}}{2a\alpha}}$$

$$\frac{d\omega}{dk} = \frac{c_0^2 k + \alpha c_0^2 \omega^2 k}{(a + b)\omega + 2a\alpha \omega^3 - \alpha c_0^2 \omega k^2}$$

where $c_0$ is a propagation speed of the radio waves in vacuum, and a, b, and $\alpha$ are the one or more parameters.

This allows the scattering tomography device to properly generate an image using the image function described above, which includes one or more parameters indicating the correspondence between a change in frequency of the radio waves and a change in the dielectric constant of the object.

For example, the information processing circuit generates the image using the measurement data obtained at a position of the transmitting antenna element and a position of the receiving antenna element also as data obtained by swapping the position of the transmitting antenna element and the position of the receiving antenna element.

This allows the scattering tomography device to reduce the number of times the position of the transmitting antenna element and the position of the receiving antenna element are changed to obtain measurement data.

For example, the scattering tomography device includes a plurality of receiving antenna elements each of which is the receiving antenna element, and the information processing circuit generates the image using the measurement data indicating the scattered waves received at each of the plurality of receiving antenna elements included in the scattering tomography device.

This allows the scattering tomography device to obtain measurement data at a plurality of reception positions for a single transmission at a single transmission position. The scattering tomography device can therefore reduce the number of transmissions and the number of changes in the reception position.

For example, the transmitting antenna element and the plurality of receiving antenna elements are aligned in a single row, the transmitting antenna element is positioned at an end of the single row in which the transmitting antenna element and the plurality of receiving antenna elements are aligned, and a radio wave absorber is disposed between (i) the transmitting antenna element and (ii) the plurality of receiving antenna elements.

This allows the transmitting antenna element and the plurality of receiving antenna elements to be arranged on a straight or curved line. Accordingly, the complexity of the calculation process and the complexity of the scanning can be reduced. Moreover, the radio wave absorber inhibits radio waves from going directly from the transmitting antenna element to the receiving antenna element without being incident on the object.

For example, in a three-dimensional space of X coordinates, Y coordinates, and Z coordinates, an X coordinate, a Y coordinate, and a Z coordinate of a position of the transmitting antenna element are identical to an X coordinate, a Y coordinate, and a Z coordinate of a position of the receiving antenna element, respectively, and the scattering field function is defined as:

$$\phi(x, y, z, k) = \iint_D \frac{e^{ik\rho}}{\rho} \frac{e^{ik\rho}}{\rho} \varepsilon(\xi, \eta, \zeta) d\xi d\eta d\zeta$$ [Math. 7]

-continued $$\rho = \sqrt{(x-\xi)^2 + (y-\eta)^2 + (z-\zeta)^2}$$

where x is an X coordinate of the transmission position and the reception position, y is a Y coordinate of the transmission position and the reception position, z is a Z coordinate of the transmission position and the reception position, D is a region including matter that generates the scattered waves by reflecting the radio waves, ξ is an X coordinate of a position in the region, η is a Y coordinate of the position in the region, ζ is a Z coordinate of the position in the region, ε(ξ, η, ζ) is a reflectivity, i is an imaginary unit, and k is a wavenumber of the radio waves.

This allows the scattering tomography device to properly derive a relational expression for deriving an image function based on the scattering field function described above, which is defined based on the position of the transmitting antenna element being the same as the position of the receiving antenna element.

For example, the equation is defined as:

$$(\partial_x^2 + \partial_y^2 + \partial_z^2 + 4k^2)\phi = 0 \quad \text{[Math. 8]}$$

This allows the scattering tomography device to properly derive the relational expression for deriving the image function based on the above partial differential equation, which is defined as an equation whose solution is the above scattering field function.

For example, the relational expression is defined as:

$$\phi(x, y, z, k) = \quad \text{[Math. 9]}$$
$$\frac{1}{(2\pi)^2} \int_{-\infty}^{\infty} \int_{-\infty}^{\infty} e^{-ik_x x - ik_y y} a(k_x, k_y, k) e^{ik\sqrt{4k^2 - k_x^2 - k_y^2}} dk_x dk_y$$

where $k_x$ is a wavenumber related to x in the scattering field function and $k_y$ is a wavenumber related to y in the scattering field function,
$a(k_x, k_y, k)$ is defined as:

$$a(k_x, k_y, k) = \sum_I e^{ik_x x_I} e^{-ik_z z_I} \tilde{\Phi}(x_I, k_y, k) \quad \text{[Math. 10]}$$
$$= \sum_I e^{ik_x x_I} e^{-ik_z f(x_I)} \tilde{\Phi}(x_I, k_y, k)$$

where I is an index of the transmission position and the reception position at which the transmitting antenna element and the receiving antenna element are present, $x_I$ is an X coordinate of the transmission position and the reception position at which the transmitting antenna element and the receiving antenna element are present, and $z_I$ and $f(x_I)$ are a Z coordinate of the transmission position and the reception position at which the transmitting antenna element and the receiving antenna element are present, and $$\tilde{\Phi}(x_I, k_y, k) \quad \text{[Math. 11]}$$

expresses the measurement data at $x_I$, $k_y$, and k.

This allows the scattering tomography device to properly derive the image function based on the above relational expression, which is defined by the measurement data corresponding to the transmission position at which the transmitting antenna element is present and the reception position at which the receiving antenna element is present.

For example, the image function is defined as:

$$\rho(x, y, z) = \frac{1}{(2\pi)^2} \int_0^\infty \int_{-\infty}^\infty \int_{-\infty}^\infty e^{-i(k_x x + k_y y)} a(k_x, k_y, k) \quad \text{[Math. 12]}$$
$$e^{ik_z z} dk_x dk_y d\omega$$
$$= \frac{1}{(2\pi)^2} \int_0^\infty \int_{-\infty}^\infty \int_{-\infty}^\infty e^{-i(k_x x + k_y y) + ik_z z}$$
$$\left\{ \sum_I e^{ik_x x_I} e^{-ik_z z_I} \tilde{\Phi}(x_I, k_y, k) \right\}$$
$$\frac{d\omega}{dk} \frac{dk}{dk_z} dk_x dk_y dk_z$$

where x in the image function is an X coordinate of the image, y in the image function is a Y coordinate of the image, and z in the image function is a Z coordinate of the image, and
variables included in an integrand in the image function are defined as:

$$k_z = \sqrt{4k^2 - k_x^2 - k_y^2} \quad \text{[Math. 13]}$$
$$k = \frac{1}{2}\sqrt{k_x^2 + k_z^2 + k_y^2}$$
$$\frac{dk}{dk_z} = \frac{k_z}{4k}$$
$$\omega = \sqrt{\frac{-(a+b-c_0^2\alpha k^2) + \sqrt{(a+b-c_0^2\alpha k^2)^2 + 4a\alpha c_0^2 k^2}}{2a\alpha}}$$
$$\frac{d\omega}{dk} = \frac{c_0^2 k + \alpha c_0^2 \omega^2 k}{(a+b)\omega + 2a\alpha\omega^3 - \alpha c_0^2 \omega k^2}$$

where $c_0$ is a propagation speed of the radio waves in vacuum, and a, b, and α are the one or more parameters.

This allows the scattering tomography device to properly generate an image using the image function described above, which includes one or more parameters indicating the correspondence between a change in frequency of the radio waves and a change in the dielectric constant of the object.

For example, the scattering tomography device includes a plurality of transmitting antenna elements each of which is the transmitting antenna element and a plurality of receiving antenna elements each of which is the receiving antenna element, the plurality of transmitting antenna elements included in the scattering tomography device respectively correspond to a plurality of polarization directions of the radio waves, and the plurality of receiving antenna elements included in the scattering tomography device respectively correspond to the plurality of polarization directions of the radio waves.

This allows the scattering tomography device to transmit and receive based on a plurality of polarization directions. The scattering tomography device can therefore obtain information corresponding to the polarization directions.

For example, the one or more parameters are defined by measuring a plurality of dielectric constants of an object of a same type as the object, relative to a plurality of frequencies of the radio waves.

This allows the scattering tomography device to properly generate an image based on one or more parameters appropriately defined as the one or more parameters indicating the correspondence between a change in frequency of the radio waves and a change in the dielectric constant of the object.

For example, the radio waves are pulsed waves.

This allows the scattering tomography device to generate a highly accurate image of the interior of an object using pulsed waves including a large number of frequency components.

For example, a scattering tomography method according to one aspect of the present disclosure includes: transmitting, by a transmitting antenna element, radio waves into an interior of an object from outside the object; receiving, outside the object, by a receiving antenna element, scattered waves of the radio waves transmitted into the interior of the object; and generating an image of the interior of the object using measurement data indicating the scattered waves received by the receiving antenna element. The generating includes: deriving, using the measurement data, a relational expression that satisfies an equation whose solution is a scattering field function that takes a transmission position of the radio waves and a reception position of the scattered waves as inputs and outputs an amount of the scattered waves at the reception position; deriving, using the relational expression, an image function that is for generating the image and includes one or more parameters indicating a correspondence between a change in frequency of the radio waves and a change in a dielectric constant of the object in accordance with Debye relaxation; and generating the image using the image function.

This makes it possible to derive a relational expression for deriving an image function based on the scattering field function, which indicates the amount of scattered waves depending on the transmission position and the reception position, and the measurement data of the scattered waves received by the receiving antenna element. In addition, the image function includes one or more parameters that indicate the correspondence between a change in frequency of the radio waves and a change in the dielectric constant of the object. Accordingly, the correspondence between a change in frequency and a change in the dielectric constant can be reflected in the generation of an image showing the interior of an object.

Accordingly, it is possible to generate a highly accurate image of the interior of an object using scattered waves of radio waves.

Hereinafter, embodiments will be described with reference to the drawings. Each of the following embodiments describes a general or specific example. The numerical values, shapes, materials, elements, the arrangement and connection of the elements, steps, the order of the steps etc., presented in the following embodiments are mere examples, and do not limit the scope of the claims.

EMBODIMENT

The scattering tomography device according to the present embodiment generates an image of the interior of an object using scattered waves of radio waves. Hereinafter, the scattering tomography device according to the present embodiment will be described in detail, including the underlying techniques and theories. Hereinafter, the techniques will be described using microwave mammography as a main example, where the radio waves are exemplified as microwaves, and the object is exemplified as a breast, but the field of application is not limited to microwave mammography; radio waves other than microwaves and objects other than a breast may be used.

I. FREQUENCY DEPENDENCE OF THE DIELECTRIC CONSTANT

First, the frequency dependence of the dielectric constant that affects the radio waves used by the scattering tomography device will be described. Maxwell's equations of electromagnetism are expressed as shown in (1-1) below.

$$\nabla \times E = -\partial_t B$$

$$\nabla \times H = j + \partial_t D$$

$$B = \mu H$$

$$D = \varepsilon E$$

... (1-1)  [Math. 14]

E is an electric field, B is magnetic flux density, t is time, H is a magnetic field, j is current, D is an electric displacement field, μ is permeability, and ε is a dielectric constant. Here, generally, waves (radio waves) propagating in a dielectric material such as a living body are examined. Accordingly, although the dielectric constant changes, the permeability is equal to a vacuum value. The dielectric constant, permeability, and current can therefore be expressed as shown in (1-2) below.

$$\varepsilon = \varepsilon_0 \varepsilon_r$$

$$\mu = \mu_0 \text{ (vacuum value)}$$

$$j = 0$$

... (1-2)  [Math. 15]

Here, $\varepsilon_0$ is the dielectric constant of vacuum, $\varepsilon_0$ is the relative dielectric constant, and $\mu_0$ is the permeability of vacuum. The equation shown in (1-3) below is obtained from the equations shown in (1-1) and (1-2) above.

$$-\nabla \times \nabla \times E = \mu_0 \varepsilon \partial_t^2 E$$

... (1-3)  [Math. 16]

Next, consider a one-dimensional wave. Since $\nabla \times E = 0$ when the wave propagation direction corresponds to the x axis and the electric field (E) direction corresponds to the y axis, the equations shown in (1-3) through (1-4) are obtained.

$$\Delta E = \mu_0 \varepsilon \partial_t^2 E$$

... (1-4)  [Math. 17]

When the y direction component of the electric field (E) is expressed as φ(t, x), a wave equation related to a one-dimensional wave can be written as shown in (1-5). In other words, this wave equation derives from Maxwell's equations.

[Math. 18]

$$\partial_t^2 \phi(t, x) - \frac{1}{\mu_0 \varepsilon} \partial_x^2 \phi(t, x) = 0 \qquad (1-5)$$

Taking into consideration resolution and transmission distance, the frequency range used for microwave mammography is, for example, from 1 GHz to 20 GHz. However, in this range, water, which constitutes a large proportion of the living body, causes dielectric dispersion.

FIG. 1 is a graph illustrating the frequency dependence of the dielectric constant and the Debye relaxation of water at 30° C. In FIG. 1, $\varepsilon_r'$ denotes the real part of the complex dielectric constant, and $\varepsilon_r''$ denotes the imaginary part of the complex dielectric constant. The higher the frequency, the lower the dielectric constant.

Figure 2A:
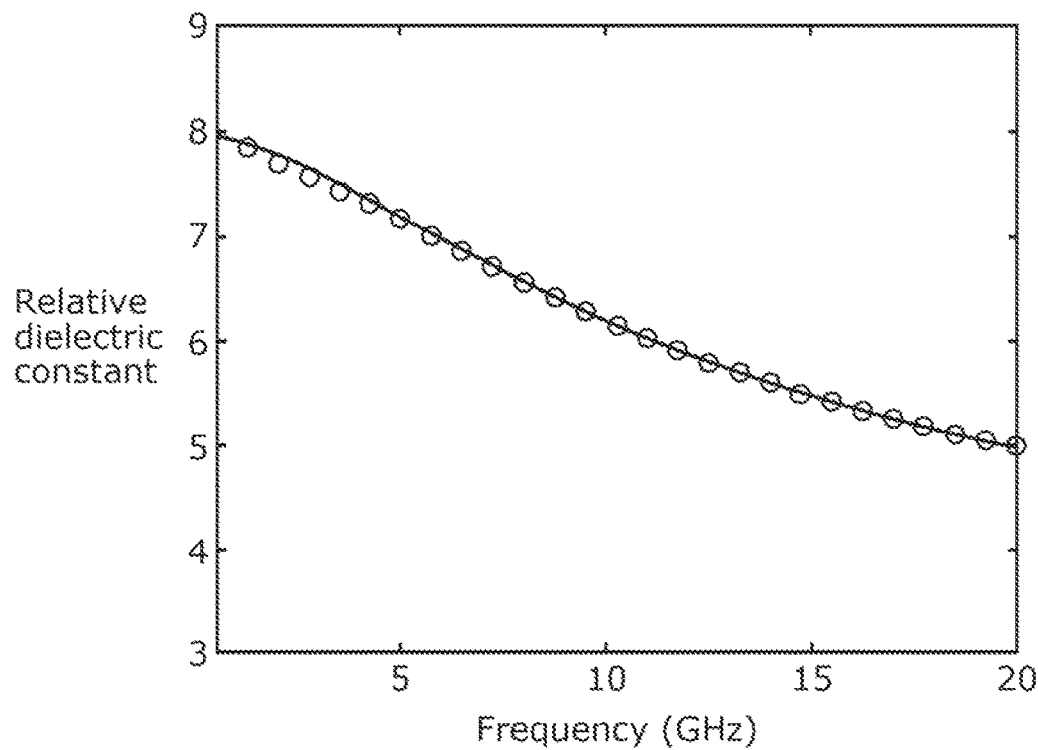
FIG. 2A is a graph illustrating the relative dielectric constant of breast adipose tissue for each frequency according to an embodiment of the present disclosure.
Figure 2B:
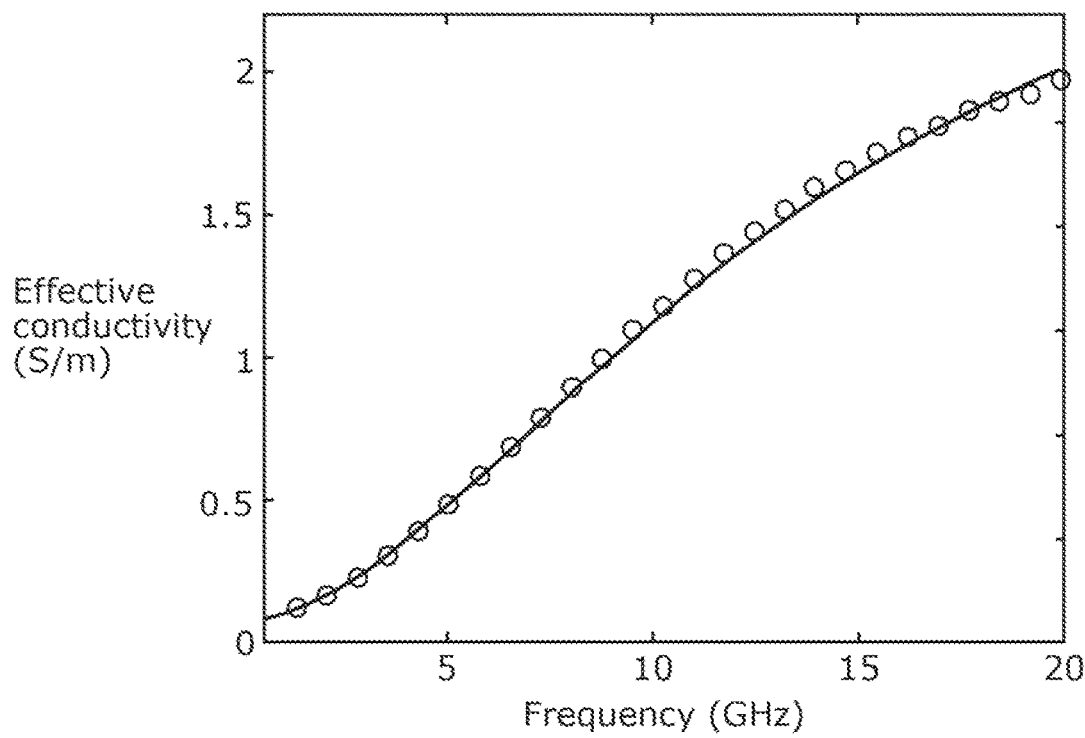
FIG. 2B is a graph illustrating the effective conductivity of breast adipose tissue for each frequency according to an embodiment of the present disclosure.

FIG. 2A and FIG. 2B illustrate dielectric dispersion in adipose tissue of the breast. More specifically, FIG. 2A shows the relative dielectric constant of breast adipose tissue for each frequency, and FIG. 2B shows the effective conductivity of breast adipose tissue for each frequency.

For example, in the 14 GHz to 20 GHz range, the dielectric constant is about 60% of the dielectric constant in the 1 GHz to 5 GHz range. According to Debye relaxation, the frequency dependence of the dielectric constant can be expressed as shown in (1-6), (1-7), (1-8), and (1-9) below.

[Math. 19]

$$\varepsilon(\omega) = \varepsilon_\infty + \frac{\varepsilon_s - \varepsilon_\infty}{1 + i\omega\tau} \quad (1\text{-}6)$$

$$\varepsilon(0) = \varepsilon_s$$

$$\varepsilon(\infty) = \varepsilon_\infty$$

[Math. 20]

$$\varepsilon(\omega) = \varepsilon_\infty + \frac{(\varepsilon_s - \varepsilon_\infty)}{1 + \omega^2\tau^2} - i\frac{\omega\tau(\varepsilon_s - \varepsilon_\infty)}{1 + \omega^2\tau^2} \quad (1\text{-}7)$$

$$\varepsilon_r(\omega) = \varepsilon_\infty + \frac{(\varepsilon_s - \varepsilon_\infty)}{1 + \omega^2\tau^2} = a + \frac{b}{1 + \alpha\omega^2}$$

[Math. 21]

$$c(\omega) = \frac{c_0}{\sqrt{\varepsilon_r(\omega)}} \quad (1\text{-}8)$$

$$\omega = c(\omega)k$$

[Math. 22]

$$\omega = \frac{c_0 k}{\sqrt{a + \frac{b}{1 + \alpha\omega^2}}} \quad (1\text{-}9)$$

Here, $\omega$ is angular frequency; $\varepsilon(\omega)$ is the complex dielectric constant at $\omega$; i is the imaginary unit; $\tau$ is relaxation time; $\varepsilon_r(\omega)$ is the real part of the complex dielectric constant at $\omega$; a, b, and $\alpha$ are constants; $c(\omega)$ is propagation speed at $\omega$, $c_0$ is propagation speed in vacuum, and k is the wavenumber. As shown in (1-8), the propagation speed depends on the dielectric constant and the dielectric constant depends on the frequency (the angular frequency). Hence, the propagation speed depends on the frequency (the angular frequency).

When frequency is denoted as f, $\omega$ can be expressed as $\omega=2\pi f$. When the equation in (1-9) is solved, f can be expressed as shown in (1-10) below.

[Math. 23]

$$f = \frac{1}{2\pi}\omega = \frac{1}{2\pi}\sqrt{\frac{-(a+b-c_0^2\alpha k^2) + \sqrt{(a+b-c_0^2\alpha k^2)^2 + 4a\alpha c_0^2 k^2}}{2a\alpha}} \quad (1\text{-}10)$$

When the frequency defined by $\omega=2\pi f$ is fixed, the wave equation is expressed as shown in (1-11) below.

[Math. 24]

$$(\partial_x^2 + \partial_y^2 + \partial_z^2)\phi(t, x, y, z) - \frac{1}{c(\omega)^2}\partial_t^2 \phi(t, x, y, z) = 0 \quad (1\text{-}11)$$

Here, x, y, and z are coordinate positions, and $\phi(t, x, y, z)$ denotes displacement of vibration at t, x, y, and z.

However, when there is dielectric dispersion, it is difficult to express waves that are not a fixed frequency with a single wave equation. This is because the motion of the molecules (dipoles) responsible for the dielectric dispersion must be considered at the same time. For example, in microwave mammography, pulsed waves including a large number of frequency components are used. In order to obtain highly accurate data, pulsed waves with sharp waveforms are practical. However, the large number of frequency components propagate at varying propagation speeds, resulting in a gradual waveform. This makes it difficult to obtain highly accurate data.

Therefore, the equation in (1-10), where frequency f is expressed in terms of the wavenumber k of space, plays an important role in solving the inverse scattering problem in a medium with dielectric dispersion. Moreover, a, b, and $\alpha$ in (1-7) are, more specifically, Debye model parameters indicating correspondence between a change in frequency and a change in the dielectric constant. The parameters are specified by measuring, in advance, the dielectric constant of a sample of the same type as the object to be tested for each frequency.

Figure 3:
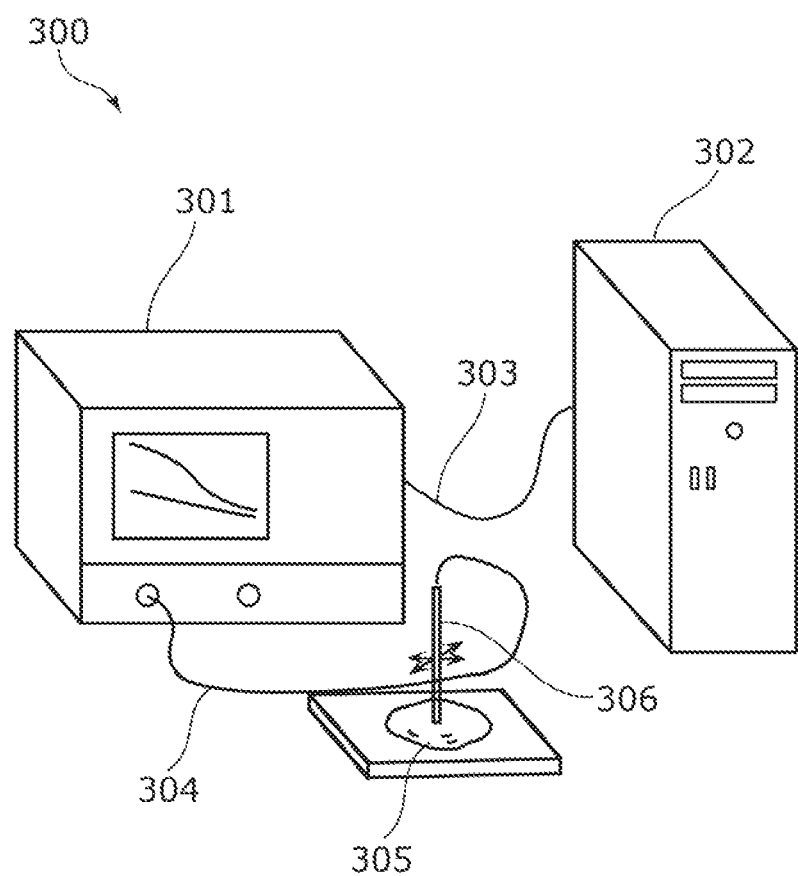
FIG. 3 schematically illustrates a measurement apparatus used to measure the dielectric constant of an excised sample according to an embodiment of the present disclosure.

FIG. 3 illustrates a measurement apparatus used to measure the dielectric constant of an excised sample. Measurement apparatus 300 illustrated in FIG. 3 is an apparatus for actually measuring the frequency dependence of the dielectric constant, and includes vector network analyzer 301, computer 302 and probe 306 for measuring the dielectric constant.

Vector network analyzer 301 and computer 302 are connected via a general purpose interface bus (GPIB) cable 303. Vector network analyzer 301 and probe 306 for measuring the dielectric constant are connected via high-frequency coaxial cable 304.

For example, excised sample 305 obtained in a surgical procedure is measured using the coaxial probe 306 for measuring the dielectric constant. Probe 306 for measuring the dielectric constant is connected to the S11 port (a port for obtaining forward direction reflections) of vector network analyzer 301. The data is stored in computer 302 via GPIB cable 303. The parameters a, b, and $\alpha$ in (1-7) are specified from a plurality of excised samples. These parameters are important in the following inverse analysis.

II. INVERSE SCATTERING PROBLEM IN A MEDIUM WITH DIELECTRIC DISPERSION

Hereinafter, a calculation process that generates an image of the interior of an object using scattered waves of radio waves will be described. Note that parts of the calculation process described in PTL 2 or PTL 3 may be used where appropriate.

<II-1. Theory of Multistatic Inverse Scattering on Curved Surface>

First, the inverse scattering problem in a medium with dielectric dispersion will be discussed, using multistatic measurement on a curved surface as one typical example. Here, we will assume that the antenna array disposed on a curve having a constant X coordinate scans along a curved surface. This assumption is quite practical in its application to microwave mammography.

Figure 4:
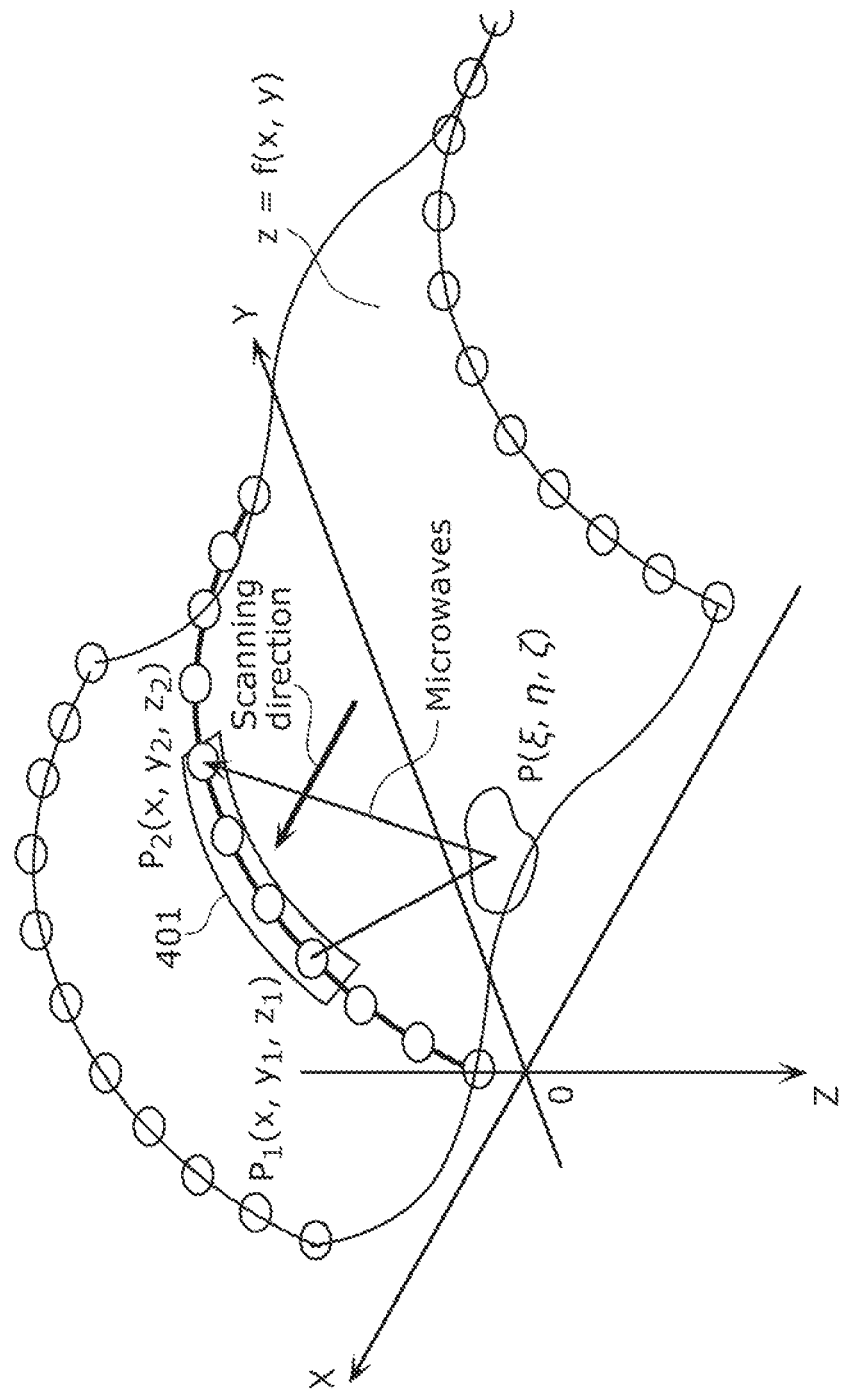
FIG. 4 illustrates an example of an antenna array scanning over a curved surface to measure scattered data according to an embodiment of the present disclosure.

FIG. 4 illustrates an example of an antenna array scanning over a curved surface to measure scattered data. In FIG. 4, antenna array 401 is a multistatic antenna, including a transmitting antenna element and a receiving antenna element, that scans along a curved surface expressed as z=f(x, y). Note that antenna array 401 may include a plurality of transmitting antenna elements and/or a plurality of receiving antenna elements.

For example, $P_1(x, y_1, z_1)$ indicates the position of the transmitting antenna element, $P_2(x, y_2, z_2)$ indicates the position of the receiving antenna element, and $P(\xi, \eta, \zeta)$ indicates the position of matter that reflects microwave. For example, microwaves are transmitted from $P_1(x, y_1, z_1)$, reflected at $P(\xi, \eta, \zeta)$, and received at $P_2(x, y_2, z_2)$.

Since the matter exhibits dielectric dispersion, $\omega = c(\omega)k$. Here, $c(\omega)$ is the propagation speed, and k is the wavenumber. When wavelength is expressed as $\lambda$, the relationship $k = 2\pi/\lambda$ holds true. Here, a scattering field function $\varphi$ like that shown below is introduced.

[Math. 25]

$$\phi(x, y_1, y_2, z_1, z_2, \omega) = \iint_D \frac{e^{ik\rho_1}}{\rho_1} \frac{e^{ik\rho_2}}{\rho_2} \varepsilon(\xi, \eta, \zeta) d\xi d\eta d\zeta \quad (2\text{-}1)$$

$$\rho_1 = \sqrt{(x-\xi)^2 + (y_1 - \eta)^2 + (z_1 - \zeta)^2}$$

$$\rho_2 = \sqrt{(x-\xi)^2 + (y_2 - \eta)^2 + (z_2 - \zeta)^2}$$

In (2-1), a time factor proportional to $\exp(-i\omega t)$ is assumed. The wavenumber is expressed as k, and the reflectivity at $P(\xi, \eta, \zeta)$ is expressed as $\varepsilon(\xi, \eta, \zeta)$.

The scattering field function $\varphi(x, y_1, y_2, z_1, z_2, \omega)$ in (2-1) can be interpreted as a function that takes an arbitrary transmission position and an arbitrary reception position having the same x coordinate on a YZ plane as inputs and outputs the amount of scattered waves at the reception position. If the transmission position and the reception position input into the scattering field function respectively match the position of the transmitting antenna element and the position of the receiving antenna element, the output of the scattering field function $\varphi$ will match the measurement data obtained from the receiving antenna element.

When $t \to 0$, $x_1 \to x$, $y_1 \to y_2 (=y)$, and $z_1 \to z_2 (=z)$ are applied to the scattering field function, after transmitting radio waves, the scattering field function is assumed to indicate the amount of scattered waves that are instantaneously received at (x, y, z), i.e., the amount of reflection at (x, y, z). An image function for generating an image of the interior of an object is derived as a function indicating such an amount as follows.

Since $\varepsilon(\xi, \eta, \zeta)$ is unknown in the initial stage, the scattering field function $\varphi(x, y_1, y_2, z_1, z_2, \omega)$ is unknown. In order to calculate the specific content of the scattering field function $\varphi(x, y_1, y_2, z_1, z_2, \omega)$, an equation which the scattering field function $\varphi(x, y_1, y_2, z_1, z_2, \omega)$ satisfies is calculated as follows.

First, the kernel function in the term to be integrated in (2-1) is expressed as shown in (2-2) below.

[Math. 26]

$$\phi = \frac{e^{ik\rho_1}}{\rho_1} \frac{e^{ik\rho_2}}{\rho_2} \quad (2\text{-}2)$$

In order to calculate the equation that the scattering field function $\varphi(x, y_1, y_2, z_1, z_2, \omega)$ in (2-1) satisfies, a partial differential equation whose solution is the kernel function $\varphi$ in (2-2) is calculated. For this purpose, it is sufficient to ignore the terms of higher order with respect to $1/\rho$ among the plurality of terms arising from the result of differentiation. Here, the shorthand notation for differentiation is defined as shown in (2-3) below.

[Math. 27]

$$\frac{\partial}{\partial t} \to \partial_t, \frac{\partial}{\partial x} \to \partial_x, \frac{\partial}{\partial y_1} \to \partial_{y_1}, \quad (2\text{-}3)$$

$$\frac{\partial}{\partial y_2} \to \partial_{y_2}, \frac{\partial}{\partial z_1} \to \partial_{z_1}, \frac{\partial}{\partial y_2} \to \partial_{y_2}$$

Using (2-3), the results of differentiation of each order of the kernel function $\varphi$ are expressed as shown in (2-4) below.

[Math. 28]

$$\partial_x \phi = ik(x-\xi)\left(\frac{1}{\rho_1} + \frac{1}{\rho_2}\right)\phi + o(\rho^{-3}) \quad (2\text{-}4)$$

$$\partial_{y_1} \phi = ik\frac{y_1 - \eta}{\rho_1}\phi + o(\rho^{-3})$$

$$\partial_{y_2} \phi = ik\frac{y_2 - \eta}{\rho_2}\phi + o(\rho^{-3})$$

$$\partial_{z_1} \phi = ik\frac{z_1 - \zeta}{\rho_1}\phi + o(\rho^{-3})$$

$$\partial_{z_2} \phi = ik\frac{z_2 - \zeta}{\rho_2}\phi + o(\rho^{-3})$$

$$\partial_x \partial_x \phi = (ik)^2 (x-\xi)^2 \left(\frac{1}{\rho_1} + \frac{1}{\rho_2}\right)^2 \phi + o(\rho^{-3})$$

$$\partial_{y_1} \partial_{y_1} \phi = (ik)^2 \left(\frac{y_1 - \eta}{\rho_1}\right)^2 \phi + o(\rho^{-3})$$

$$\partial_{y_2} \partial_{y_2} \phi = (ik)^2 \left(\frac{y_2 - \eta}{\rho_2}\right)^2 \phi + o(\rho^{-3})$$

$$\partial_{z_1} \partial_{z_1} \phi = (ik)^2 \left(\frac{z_1 - \zeta}{\rho_1}\right)^2 \phi + o(\rho^{-3})$$

$$\partial_{z_2} \partial_{z_2} \phi = (ik)^2 \left(\frac{z_2 - \zeta}{\rho_2}\right)^2 \phi + o(\rho^{-3})$$

In (2-4), $\rho$ corresponds to $\rho_1$ and $\rho_2$. Moreover, o is a Landau symbol, and if $\rho$ is sufficiently large, $o(\rho^{-3})$ is much smaller than $\rho^{-3}$. Since $o(\rho^{-3})$ is assumed to be sufficiently small, the trivial $o(\rho^{-3})$ term is omitted below. Summing the five equations related to the second-order differential in equation (2-4) yields (2-5) shown below.

[Math. 29]

$$\Delta_5 \phi = (\partial_x^2 + \partial_{y_1}^2 + \partial_{y_2}^2 + \partial_{z_1}^2 + \partial_{z_2}^2)\phi \quad (2\text{-}5)$$

$$= (ik)^2 \left\{2 + 2\frac{(x-\xi)^2}{\rho_1 \rho_2}\right\}\phi$$

Furthermore, (2-6) shown below is obtained from (2-5).

[Math. 30]

$$\{\Delta_5 - 2(ik)^2\}\phi = 2(ik)^2 \frac{\rho_1^2 - (y_1 - \eta)^2 - (z_1 - \zeta)^2}{\rho_1 \rho_2} \phi \quad (2\text{-}6)$$

$$= 2(ik)^2 \frac{\rho_2^2 - (y_2 - \eta)^2 - (z_2 - \zeta)^2}{\rho_1 \rho_2} \phi$$

Operating the operator on the left of the equation in (2-6) twice yields (2-7) shown below.

[Math. 31]

$$\{\Delta_5 - 2(ik)^2\}^2 \phi = 4(ik)^4 \frac{\{\rho_1^2 - (y_1-\eta)^2 - (z_1-\zeta)^2\}}{\rho_1^2 \rho_2^2} \phi \quad (2\text{-}7)$$
$$= 4(ik)^4 \{1 - (ik)^{-2}\partial_{y_1}^2 - (ik)^{-2}\partial_{z_1}^2\}$$
$$\{1 - (ik)^{-2}\partial_{y_2}^2 - (ik)^{-2}\partial_{z_2}^2\} \phi$$

Accordingly, the kernel function φ satisfies the equation shown in (2-8) below.

[Math. 32]

$$\left[\frac{1}{4}\{\Delta_5 - 2(ik)^2\}^2 - (ik)^4 \right. \quad (2\text{-}8)$$
$$\left. \{1 - (ik)^{-2}\partial_{y_1}^2 - (ik)^{-2}\partial_{z_1}^2\}\{1 - (ik)^{-2}\partial_{y_2}^2 - (ik)^{-2}\partial_{z_2}^2\}\right]\phi = 0$$

This is reorganized as shown in (2-9) below.

[Math. 33]

$$\left[\frac{1}{4}\Delta_5^2 - (ik)^2 \partial_x^2 - \left(\partial_{y_1}^2 + \partial_{z_1}^2\right)\left(\partial_{y_2}^2 + \partial_{z_2}^2\right)\right]\phi = 0 \quad (2\text{-}9)$$
$$\Delta_5 = \partial_x^2 + \partial_{y_1}^2 + \partial_{y_2}^2 + \partial_{z_1}^2 + \partial_{z_2}^2$$

(2-9) shows an equation whose solution is the kernel function φ shown in (2-2). Stated differently, the kernel function φ satisfies (2-9). In (2-9), the kernel function φ can be substituted by the scattering field function φ shown in (2-1). Accordingly, (2-9) can be said to show an equation whose solution is the scattering field function φ shown in (2-1). In other words, the scattering field function φ satisfies (2-9).

On the other hand, the time-dependent wave equation cannot be easily derived from (2-9) because the propagation speed of radio waves varies with frequency. Therefore, a time-dependent partial differential equation is derived using a method that employs a pseudo-differential operator, to be described later. In doing so, the variables are substituted as shown in (2-10) and (2-11) below.

[Math. 34]

$$\omega \to i\partial_t \quad (2\text{-}10)$$

[Math. 35]

$$k^2 = \frac{\omega^2}{c_0^2}\left(a + \frac{b}{1+\alpha\omega^2}\right) \to \frac{-\partial_t^2}{c_0^2}\left(a + \frac{b}{1-\alpha\partial_t^2}\right) \quad (2\text{-}11)$$

Applying the substitutions shown in (2-10) and (2-11) to (2-9) yields (2-12) shown below as an equation for the scattering field in a medium with dielectric dispersion.

[Math. 36]

$$\left[\frac{1}{4}\Delta_5^2 - \frac{\partial_t^2}{c_0^2}\left(a + \frac{b}{1-\alpha\partial_t^2}\right)\partial_x^2 - \left(\partial_{y_1}^2 + \partial_{z_1}^2\right)\left(\partial_{y_2}^2 + \partial_{z_2}^2\right)\right] \quad (2\text{-}12)$$
$$\phi(x, y_1, y_2, z_1, z_2, t) = 0$$
$$\Delta_5 = \partial_x^2 + \partial_{y_1}^2 + \partial_{y_2}^2 + \partial_{z_1}^2 + \partial_{z_2}^2$$

A pseudo-differential operator to be described later is used in (2-11) and (2-12). The equation in (2-12) is a linear differential equation and is the fundamental equation for the scattering field when there is dielectric dispersion. This equation can have as its solution a general time-dependent function that can be formed by combining a fixed frequency solution satisfying (2-9) with multiple frequencies at each frequency.

It is not easy to directly calculate the solution of the equation in (2-12). Therefore, we fix the frequency and find the solution of the scattering field equation from (2-9). Since fixing the frequency fixes the propagation speed, a time-dependent wave equation can be obtained from (2-9). Specifically, variables in (2-9) are substituted as shown in (2-13) below. Here, c is the propagation speed of radio waves at the fixed frequency.

[Math. 37]

$$-ik \to \frac{1}{c}\partial_t \quad (2\text{-}13)$$

These substitutions yield (2-14) as a time-dependent wave equation at the fixed frequency.

[Math. 38]

$$\left[\frac{1}{4}\Delta_5^2 - \frac{1}{c^2}\partial_t^2 \partial_x^2 - \left(\partial_{y_1}^2 + \partial_{z_1}^2\right)\left(\partial_{y_2}^2 + \partial_{z_2}^2\right)\right]\phi(x, y_1, y_2, z_1, z_2, t) = 0 \quad (2\text{-}14)$$

In order to solve (2-9) for each wavenumber k, multiple Fourier transforms related to t, x, $y_1$, and $y_2$ are performed on φ in (2-14) derived from (2-9), as shown in (2-15) below.

[Math. 39]

$$\hat{\phi}(k_x, k_{y_1}, k_{y_2}, z_1, z_2, \omega) = \quad (2\text{-}15)$$
$$\int_{-\infty}^{\infty} e^{i\omega t} dt \int_{-\infty}^{\infty} e^{ik_{y_1} y_1} dy_1 \int_{-\infty}^{\infty} e^{ik_{y_2} y_2} dy_2 \int_{-\infty}^{\infty} e^{ik_x x} \phi(x, y_1, y_2, z_1, z_2, t) dx$$

Replacing $\partial_{z_1}$ and $\partial_{z_2}$ with $D_{z_1}$ and $D_{z_2}$ yields the equation in (2-16) from (2-14) and (2-15).

$$\{(D_{z_1}^2 + D_{z_2}^2 - k_x^2 - k_{y_1}^2 - k_{y_2}^2)^2 - 4k^2 k_x^2 - 4(D_{z_1}^2 - k_{y_1}^2)(D_{z_2}^2 - k_{y_2}^2)\}\hat{\phi} = 0$$

... (2-16)  [Math. 40]

The fundamental solution of (2-16) is expressed as shown in (2-17) below.

$$E(k_x, k_{y_1}, k_{y_2}, z_1, z_2) = \exp(is_1 z_1)\exp(is_2 z_2)$$

... (2-17)  [Math. 41]

Here, $s_1$ and $s_2$ are functions determined as shown in (2-18) below.

[Math. 42]

$$s_1(k_x, k_{y_1}, k_{y_2}) = \frac{\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}} \quad (2\text{-}18)$$

$$s_2(k_x, k_{y_1}, k_{y_2}) = \frac{\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

Using $s1(k_x, k_{y_1}, k_{y_2})$ and $s2(k_x, k_{y_1}, k_{y_2})$ from (2-18), the solution of (2-9) for each wavenumber k can be expressed as shown in (2-19) below.

[Math. 43]

$$\phi(x, y_1, y_2, z_1, z_2, k) = \qquad (2\text{-}19)$$

$$\frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)} a(k_x, k_{y_1}, k_{y_2}, k)$$

$$e^{is_1(k_x, k_{y_1}, k_{y_2})z_1} e^{is_2(k_x, k_{y_1}, k_{y_2})z_2} dk_x dk_{y_1} dk_{y_2}$$

Next, the function $a(k_x, k_{y_1}, k_{y_2}, k)$ in (2-19) is associated with the measurement data.

Figure 5:
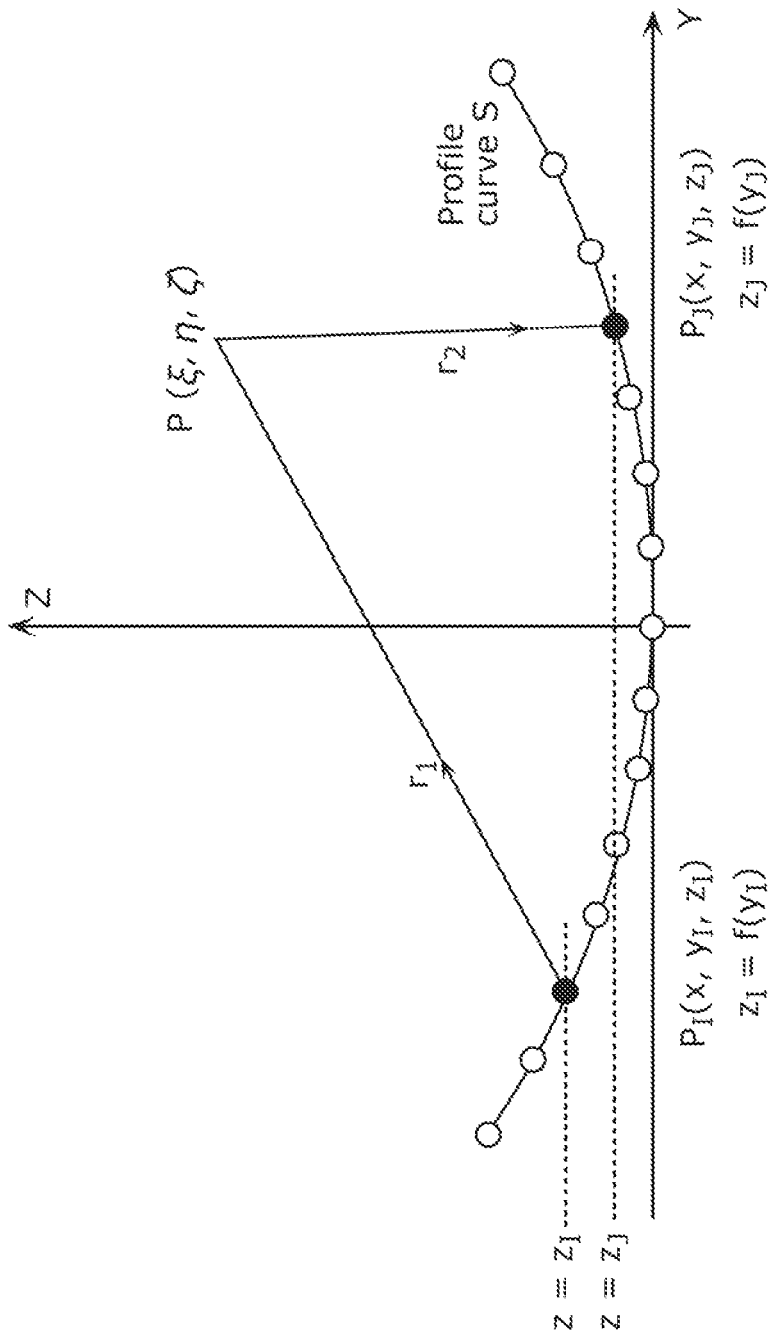
FIG. 5 is a schematic diagram illustrating the relationship between the position of the transmitting antenna element, the position of the receiving antenna element, and the position of the matter according to an embodiment of the present disclosure.

FIG. 5 is a schematic diagram illustrating the relationship between the position of the transmitting antenna element, the position of the receiving antenna element, and the position of the matter. For example, microwaves are transmitted from $P_I(x, y_I, z_I)$, which is the position of the transmitting antenna element, reflected at $P(\xi, \eta, \zeta)$, which is the position of the matter, and received at $P_J(x, y_J, z_J)$, which is the position of the receiving antenna element. The profile curve S illustrated in FIG. 5 represents a y-z cross section of the scanning surface of antenna array 401 illustrated in FIG. 4.

For example, the equation for the profile curve S having a fixed x value is assumed to be like the equation in (2-20) below. It is assumed here that the scanning surface of antenna array 401 illustrated in FIG. 4 is not curved in the x direction and that the y-z cross section of the scanning surface is given by the following equation.

$$z = f(y)$$

... (2-20) [Math. 44]

Assuming that the values of $\varphi(x, y_1, y_2, f(y_1), f(y_2), k)$ are obtained on the curved surface, the integral equation shown in (2-21) below is obtained from (2-19).

[Math. 45]

$$\phi(x, y_1, y_2, f(y_1), f(y_2), k) \qquad (2\text{-}21)$$

$$= \frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)}$$

$$a(k_x, k_{y_1}, k_{y_2}) e^{i\{s_1(k_x, k_{y_1}, k_{y_2})f(y_1) + s_2(k_x, k_{y_1}, k_{y_2})f(y_2)\}} dk_x dk_{y_1} dk_{y_2}$$

Next, the solution to the integral equation in (2-21) is calculated. The Fourier-transformed function $\phi(k_x, y_I, y_J, k)$ of $\varphi(x, y_I, y_J, z_I, z_J, t)$ measured at points $P_I$ and $P_J$ on the curved surface can be expressed as shown in (2-22) below.

[Math. 46]

$$\Phi_{I,J}(k_x, y_I, y_J, k) = \int_{-\infty}^{\infty}\int_{-\infty}^{\infty} e^{-ikt - ik_x x} \phi(x, y_I, y_J, z_I, z_J, t) dt dx \qquad (2\text{-}22)$$

Here, since $z_I$ and $z_J$ are on a profile curve, they can be expressed as shown in (2-23) below.

$$z_I = f(y_I)$$

$$z_J = f(z_J)$$

... (2-23) [Math. 47]

(2-24) shown below is obtained from a combination of (2-21), (2-22), and (2-23).

[Math. 48]

$$\Phi(k_x, y_I, y_J, k) = \qquad (2\text{-}24)$$

$$\frac{1}{(2\pi)^2}\int_{-\infty}^{\infty}\int_{-\infty}^{\infty} e^{-i(k_{y_1} y_I + k_{y_2} y_J)} a_{I,J}(k_x, k_{y_1}, k_{y_2}, k) e^{is_1(k, k_x, k_{y_1}, k_{y_2})z_I}$$

$$e^{is_2(k, k_x, k_{y_1}, k_{y_2})z_J} dk_{y_1} dk_{y_2}$$

(2-24) can be transformed as illustrated in (2-25) by focusing on $y_I$, the Y coordinate of the transmitting antenna element, and $y_J$, the Y coordinate of the receiving antenna element. Here, $(x, y_I, z_I)$ and $(x, y_J, z_J)$ are the positions of the measurement points (the positions of the transmitting antenna element and the receiving antenna element) in a reference Cartesian coordinate system, and $\delta$ denotes the delta function.

[Math. 49]

$$\Phi(k_x, y_I, y_J, k)\delta(y_1 - y_I)\delta(y_2 - y_J) = \qquad (2\text{-}25)$$

$$\frac{1}{(2\pi)^2}\int_{-\infty}^{\infty}\int_{-\infty}^{\infty} e^{-i(k_{y_1} y_1 + k_{y_2} y_2)} a_{I,J}(k_x, k_{y_1}, k_{y_2}, k)$$

$$e^{is_1(k, k_x, k_{y_1}, k_{y_2})z_I} e^{is_2(k, k_x, k_{y_1}, k_{y_2})z_J} dk_{y_1} dk_{y_2}$$

Taking the Fourier transform of both sides of the equation in (2-25) yields (2-26).

[Math. 50]

$$\int_{-\infty}^{\infty}\int_{-\infty}^{\infty} e^{i(k'_{y_1} y_1 + k'_{y_2} y_2)} \Phi(k_x, y_I, y_J, k)\delta(y_1 - y_I)\delta(y_2 - y_J) dy_1 dy_2 = \qquad (2\text{-}26)$$

$$\int_{-\infty}^{\infty}\int_{-\infty}^{\infty} e^{i(k'_{y_1} y_1 + k'_{y_2} y_2)} \left\{\frac{1}{(2\pi)^2}\int_{-\infty}^{\infty}\int_{-\infty}^{\infty} e^{-i(k_{y_1} y_1 + k_{y_2} y_2)} a_{I,J}(k_x, k_{y_1}, k_{y_2}, k)\right.$$

-continued $$e^{is_1(k,k_x,k_{y_1},k_{y_2})z_I} e^{is_2(k,k_x,k_{y_1},k_{y_2})z_J} dk_{y_1} dk_{y_2} \bigg\} dy_1 dy_2$$

This integration yields (2-27).

[Math. 51]

$$e^{i(k'_{y_1} y_1 + k'_{y_2} y_2)} \Phi(k, k_x, y_I, y_J) = \quad (2\text{-}27)$$

$$\Bigg\{ \int_{-\infty}^{\infty} \int_{-\infty}^{\infty} \delta(k_{y_1} - k'_{y_1}) \delta(k_{y_2} - k'_{y_2}) a(k_x, k_{y_1}, k_{y_2}, k)$$

$$e^{is_1(k,k_x,k_{y_1},k_{y_2})z_I} e^{is_2(k,k_x,k_{y_1},k_{y_2})z_J} dk_{y_1} dk_{y_2} \Bigg\} =$$

$$a_{I,J}(k_x, k'_{y_1}, k'_{y_2}, k) e^{is_1(k,k_x,k'_{y_1},k'_{y_2})z_I} e^{is_2(k,k_x,k'_{y_1},k'_{y_2})z_J}$$

From equation (2-27), $a_{I,J}$ can be calculated as in shown in (2-28) below.

[Math. 52]

$$a_{I,J}(k_x, k_{y_1}, k_{y_2}, k) = \quad (2\text{-}28)$$

$$e^{i(k_{y_1} y_I + k_{y_2} y_J)} e^{-is_1(k,k_x,k_{y_1},k_{y_2})z_I} e^{-is_2(k,k_x,k_{y_1},k_{y_2})z_J} \Phi(k_x, y_I, y_J, k)$$

The summation of (2-28) for all I and J yields (2-29).

[Math. 53]

$$a(k_x, k_{y_1}, k_{y_2}, k) = \sum_{I,J} a_{I,J}(k_x, k_{y_1}, k_{y_2}, k) \quad (2\text{-}29)$$

$$= \sum_{I,J} e^{i(k_{y_1} y_I + k_{y_2} y_J)}$$

$$e^{-is_1(k,k_x,k_{y_1},k_{y_2})z_I} e^{-is_2(k,k_x,k_{y_1},k_{y_2})z_J}$$

$$\Phi(k_x, y_I, y_J, k)$$

The relational expressions in (2-19) and (2-29) are obtained as the solution of (2-9). Stated differently, the relational expressions in (2-19) and (2-29) are relational expressions that satisfy (2-9) and represent the solution of (2-9). Although k is used in (2-19), k can be transformed to ω based on (1-9).

When t→0, x→x, y1→y2 (=y), and z1→z2 (=z) are applied to the relational expressions in (2-19) and (2-29), after transmitting radio waves, a function indicating the amount of scattered waves that are instantaneously received is obtained. (2-30) shown below corresponds to such a function. A reconstructed image is calculated by integrating (2-30) with respect to k or ω.

[Math. 54]

$$\phi(x, y, y, z, k) = \quad (2\text{-}30)$$

$$\underset{y_1 \to y}{\text{Lim}}[\phi(x, y_1, y, z, k)] = \underset{y_1 \to y}{\text{Lim}} \Bigg[ \frac{1}{(2\pi)^3} \int_{-\infty}^{\infty} \int_{-\infty}^{\infty} \int_{-\infty}^{\infty} e^{-i(k_x x + k_{y_1} y_1 + k_y y)}$$

$$a(k_x, k_{y_1}, k_y, k) e^{i\left\{\sqrt{\left(\sqrt{k^2 - k_{y_1}^2} + \sqrt{k^2 - k_y^2}\right)^2 - k_1^2}\right\} z} dk_x dk_{y_1} dk_y \Bigg]$$

Accordingly, the variable $k_z$ is introduced as shown in (2-31). Note that (2-31) also shows an expression for k in terms of $k_z$ and a function obtained by differentiating k in terms of $k_z$.

[Math. 55]

$$k_z = \sqrt{\left(\sqrt{k^2 - k_{y_1}^2} + \sqrt{k^2 - k_{y_2}^2}\right)^2 - k_x^2} \quad (2\text{-}31)$$

$$k = \frac{1}{2} \sqrt{k_x^2 + k_z^2 + \frac{(k_{y_1}^2 - k_{y_2}^2)^2}{k_x^2 + k_z^2} + 2(k_{y_1}^2 + k_{y_2}^2)}$$

$$\frac{dk}{dk_z} = \frac{k_z \sqrt{k^2 - k_{y_1}^2} \sqrt{k^2 - k_{y_2}^2}}{k(k_x^2 + k_z^2)}$$

From (1-10), the relationship between the wavenumber k and the frequency ω is given by (2-32) and (2-33) shown below.

[Math. 56]

$$\omega = \sqrt{\frac{-(a + b - c_0^2 \alpha k^2) + \sqrt{(a + b - c_0^2 \alpha k^2)^2 + 4a\alpha c_0^2 k^2}}{2a\alpha}} \quad (2\text{-}32)$$

[Math. 57]

$$\frac{d\omega}{dk} = \frac{c_0^2 k + \alpha c_0^2 \omega^2 k}{(a + b)\omega + 2a\alpha \omega^3 - \alpha c_0^2 \omega k^2} \quad (2\text{-}33)$$

The measurement data $\phi(k_x, y_I, y_J, k)$ included in the definition of $a(k_x, k_{y_1}, k_{y_2}, k)$ is given by ω, not k, so the k–ω transformation as described above is necessary. This incorporates the dielectric dispersion equation in (1-9). The reconstructed image obtained by integrating (2-30) with respect to ω is derived as shown in (2-34) below. (2-34) can also be expressed as an image function for generating the reconstructed image.

[Math. 58]

$$\rho(x, y, z) = \int_{-\infty}^{\infty} \underset{y_1 \to y_2 = y}{\text{Lim}} [\phi(x, y_1, y_2, z, k)] d\omega \quad (2\text{-}34)$$

$$= \int_{-\infty}^{\infty} \frac{1}{(2\pi)^3} \int_{-\infty}^{\infty} \int_{-\infty}^{\infty} \int_{-\infty}^{\infty} e^{-i(k_x x + k_{y_1} y + k_{y_2} y)}$$

-continued $$e^{ik_2 z} a(k_x, k_{y_1}, k_{y_2}, k)\left(\frac{dk}{dk_z}\right)\left(\frac{d\omega}{dk}\right) dk_x dk_{y_1} dk_{y_2} dk_z$$

The variables in the integrand in (2-34) are expressed as shown in (2-35) below.

[Math. 59]

$$k_z = \sqrt{\left(\sqrt{k^2 - k_{y_1}^2} + \sqrt{k^2 - k_{y_2}^2}\right)^2 - k_x^2} \quad (2\text{-}35)$$

$$k = \frac{1}{2}\sqrt{k_x^2 + k_z^2 + \frac{(k_{y_1}^2 - k_{y_2}^2)^2}{k_x^2 + k_z^2} + 2(k_{y_1}^2 + k_{y_2}^2)}$$

$$\frac{dk}{dk_z} = \frac{k_z\sqrt{k^2 - k_{y_1}^2}\sqrt{k^2 - k_{y_2}^2}}{k(k_x^2 + k_z^2)}$$

$$\omega = \sqrt{\frac{-(a + b - c_0^2 \alpha k^2) + \sqrt{(a + b - c_0^2 \alpha k^2)^2 + 4a\alpha c_0^2 k^2}}{2a\alpha}}$$

$$\frac{d\omega}{dk} = \frac{c_0^2 k + \alpha c_0^2 \omega^2 k}{(a+b)\omega + 2a\alpha\omega^2 = \alpha c_0^2 \omega k^2}$$

This concludes the detailed description of the reconstruction theory that measures scattered data on a curved surface to obtain a three-dimensional image of the interior of a region.

<II-2. Theory of Monostatic Inverse Scattering on Curved Surface>

Figure 6:
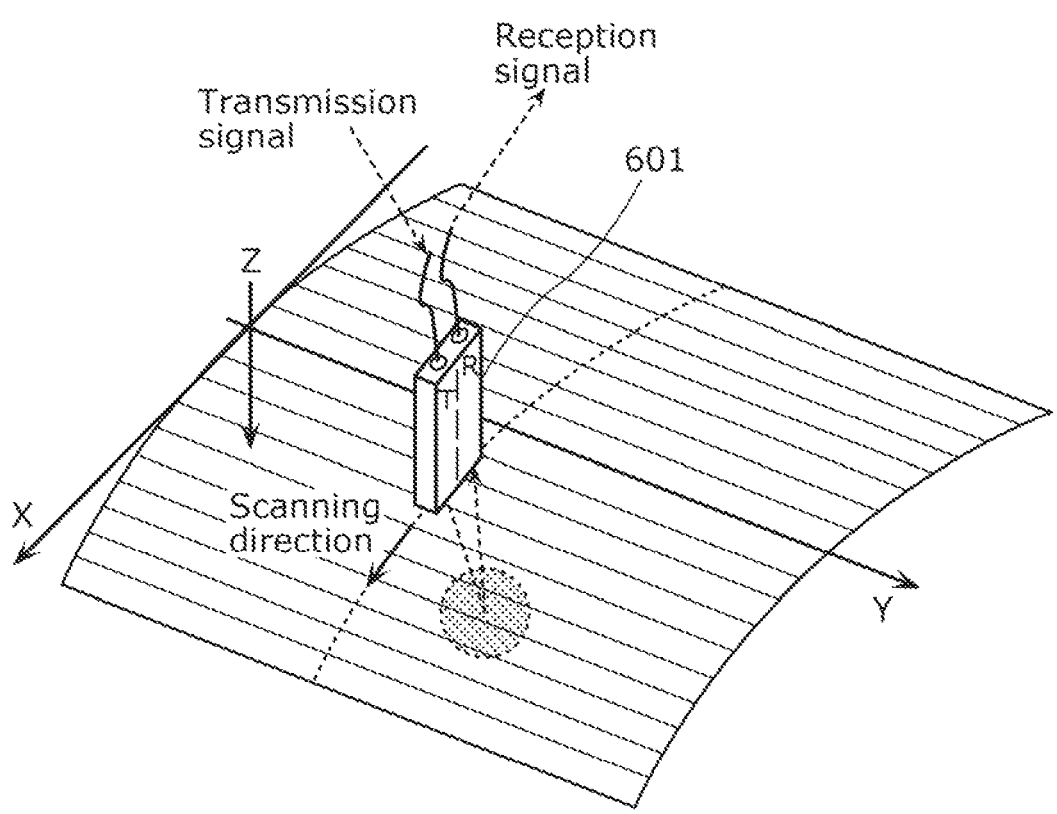
FIG. 6 illustrates an example of a monostatic antenna scanning over a curved surface to measure scattered data according to an embodiment of the present disclosure.

FIG. 6 illustrates an example of a monostatic antenna scanning over a curved surface to measure scattered data. In this example, monostatic antenna 601 combines a transmitting antenna element with a receiving antenna element and scans along a curved surface. The transmitting antenna element and the receiving antenna element of monostatic antenna 601 are assumed to be positioned at the same point. In other words, monostatic antenna 601 transmits and receives at the same point.

Monostatic antenna 601 scans along the curve in the x-axis direction, then displaces in the y-axis direction, and again scans along the curve in the x-axis direction. Monostatic antenna 601 repeats these steps to scan along the curved surface. As an example, the data is obtained on a straight line with respect to the y-axis direction and on a curve defined by z=f(x) with respect to the x-axis direction. A boundary condition is then given on the surface.

In essence, the theory described above with respect to antenna array 401 may also apply to monostatic antenna 601. However, the formula is different for monostatic antenna 601 since the transmission and reception take place at the same point.

Figure 7:
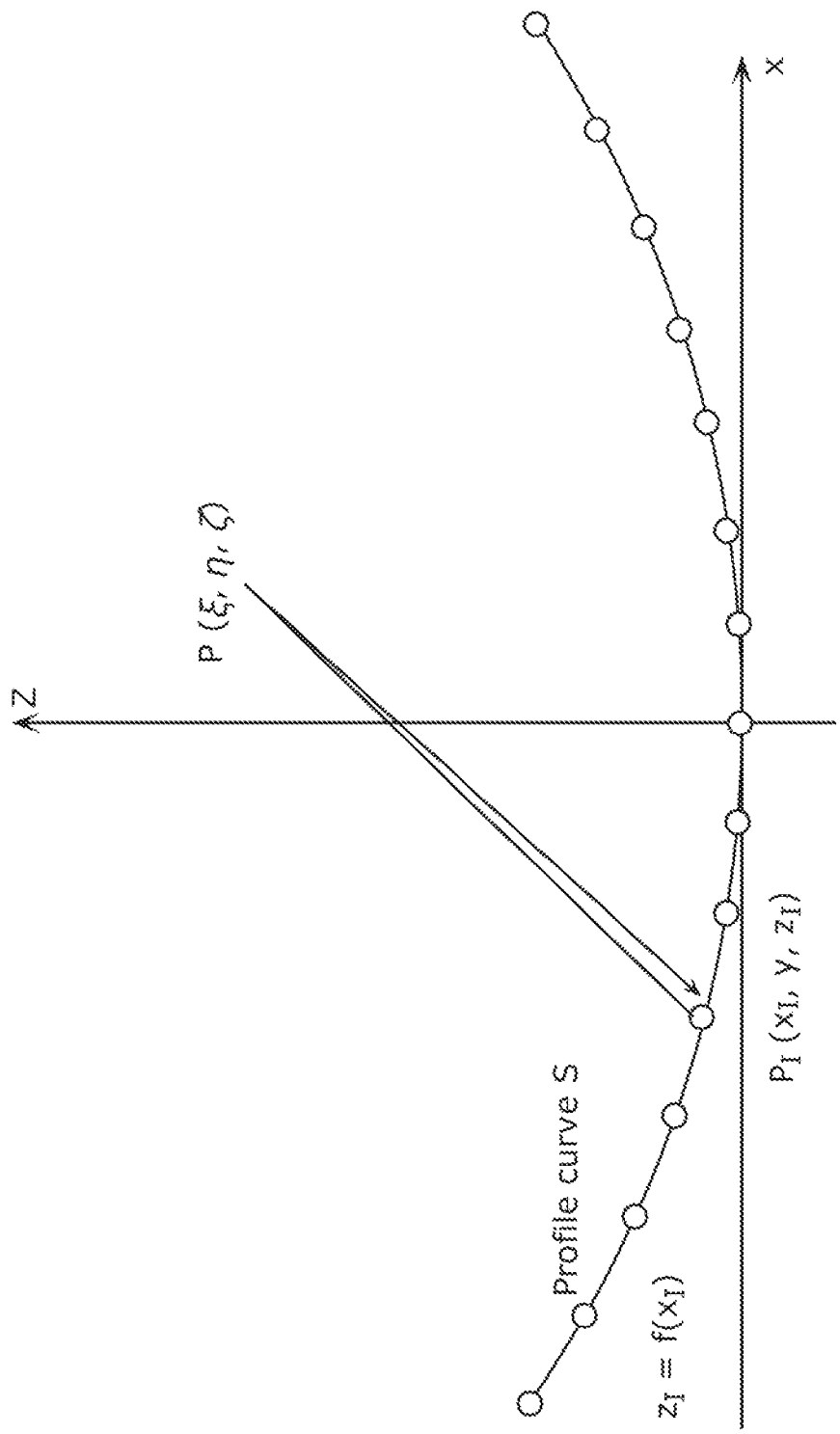
FIG. 7 is a schematic diagram illustrating the relationship between the position of the transmitting and receiving and the position of the matter according to an embodiment of the present disclosure.

FIG. 7 is a schematic diagram illustrating the relationship between the position of the transmitting and receiving and the position of the matter. The profile curve S illustrated in FIG. 7 represents an x-z cross section of the scanning surface of monostatic antenna 601 illustrated in FIG. 6. Monostatic antenna 601 scans along the curve S defined by z=f(x) in the x-axis direction. In other words, $P_I(x_I, y, z_I)$, which is the position of the transmitting and receiving and also the position of the measurement point, moves on the profile curve S.

Consider a wave radiated from point $P_I$ on the profile curve S, reflected at point P, and received at point $P_I$ again. For example, microwaves are emitted from $P_I(x_I, y, z_I)$, reflected at $P(\xi, \eta, \zeta)$, and received at $P_I(x_I, y, z_I)$. The scattering field function $\varphi$, which indicates the scattering intensity, can be written as shown in (3-1) below.

[Math. 60]

$$\phi(x, y, z, k) = \int\int\int_D \frac{e^{ik\rho}}{\rho}\frac{e^{ik\rho}}{\rho}\varepsilon(\xi, \eta, \zeta)d\xi d\eta d\zeta \quad (3\text{-}1)$$

$$\rho = \sqrt{(x-\xi)^2 + (y-\eta)^2 + (z-\zeta)^2}$$

The scattering field function in (3-1) satisfies the equation expressed as shown in (3-2) below. In other words, the scattering field function in (3-1) satisfies (3-2).

$$(\partial_x^2 + \partial_y^2 + \partial_z^2 + 4k^2)\phi = 0$$

... (3-2) [Math. 61]

The relationship between k and $\omega$ is given by (3-3) shown below.

[Math. 62]

$$k = \frac{\omega}{c_0}\sqrt{a + \frac{b}{1 + \alpha\omega^2}} \quad (3\text{-}3)$$

The time-dependent scattering field equation is expressed as shown in (3-4) below.

[Math. 63]

$$\left[\partial_x^2 + \partial_y^2 + \partial_z^2 - \frac{4\partial_t^2}{c_0^2}\left(a + \frac{b}{1 - \alpha\partial_t^2}\right)\right]\phi(x, y, z, t) = 0 \quad (3\text{-}4)$$

The general solution of the scattering field equation with a fixed frequency is given by (3-5) shown below. Here, $k_x$ is the wavenumber related to x in the scattering field function $\varphi$ and $k_y$ is the wavenumber related to y in the scattering field function $\varphi$.

[Math. 64]

$$\phi(x, y, z, k) = \frac{1}{(2\pi)^2}\int_{-\infty}^{\infty}\int_{-\infty}^{\infty} e^{-ik_x x - ik_y y} a(k_x, k_y, k) e^{iz\sqrt{4k^2 - k_x^2 - k_y^2}} dk_x dk_y \quad (3\text{-}5)$$

The equation for the curved surface that corresponds to the scanning surface is expressed as shown in (3-6) below.

$z = f(x)$

... (3-6) [Math. 65]

Here, $a(k_x, k_y, k)$ can be calculated as shown in (3-7) by using a value measured on the surface as a boundary condition.

[Math. 66]

$$a(k_x, k_y, k) = \sum_I e^{ik_x x_I} e^{-ik_z z_I} \Phi(x_I, k_y, k) \quad (3\text{-}7)$$

-continued $$= \sum_I e^{ik_x x_I} e^{-ik_z f(x_I)} \tilde{\Phi}(x_I, k_y, k)$$

Here, Math. 67 is a measurement value of scattered data at $x_I$, $k_y$, and k.

$$\tilde{\Phi}(x_I, k_y, k) \qquad \text{[Math. 67]}$$

Taking $\phi(x, y, \omega)$ as the Fourier image of the scattered data with respect to time, we obtain the visualization function expressed as shown in (3-8) below.

[Math. 68]

$$\rho(x, y, z) = \frac{1}{(2\pi)^2} \int_0^\infty \int_{-\infty}^\infty \int_{-\infty}^\infty e^{-i(k_x x + k_y y)} a(k_x, k_y, k) e^{ik_z z} dk_x dk_y d\omega \quad (3\text{-}8)$$

$$= \frac{1}{(2\pi)^2} \int_0^\infty \int_{-\infty}^\infty \int_{-\infty}^\infty e^{-i(k_x x + k_y y) + ik_z z}$$

$$\left\{ \sum_I e^{ik_x x_I} e^{-ik_z f(x_I)} \tilde{\Phi}(x_I, k_y, k) \right\} \frac{d\omega}{dk} \frac{dk}{dk_z} dk_x dk_y dk_z$$

The relationships shown in (3-9) below hold. The dispersive nature of the dielectric constant arises in the connection between $\omega$ and k.

[Math. 69]

$$k_z = \sqrt{4k^2 - k_x^2 - k_y^2} \qquad (3\text{-}9)$$

$$k = \frac{1}{2}\sqrt{k_x^2 + k_y^2 + k_z^2}$$

$$\frac{dk}{dk_z} = \frac{k_z}{4k}$$

$$\omega = \sqrt{\frac{-(a + b - c_0^2 \alpha k^2) + \sqrt{(a + b - c_0^2 \alpha k^2)^2 + 4a\alpha c_0^2 k^2}}{2a\alpha}}$$

$$\frac{d\omega}{dk} = \frac{c_0^2 k + \alpha c_0^2 \omega^2 k}{(a + b)\omega + 2a\alpha \omega^3 - \alpha c_0^2 \omega k^2}$$

III. OUTLINE OF UWB MICROWAVE RADAR DEVICE

Next, an outline of a multistatic radar array system will be given.

Figure 8:
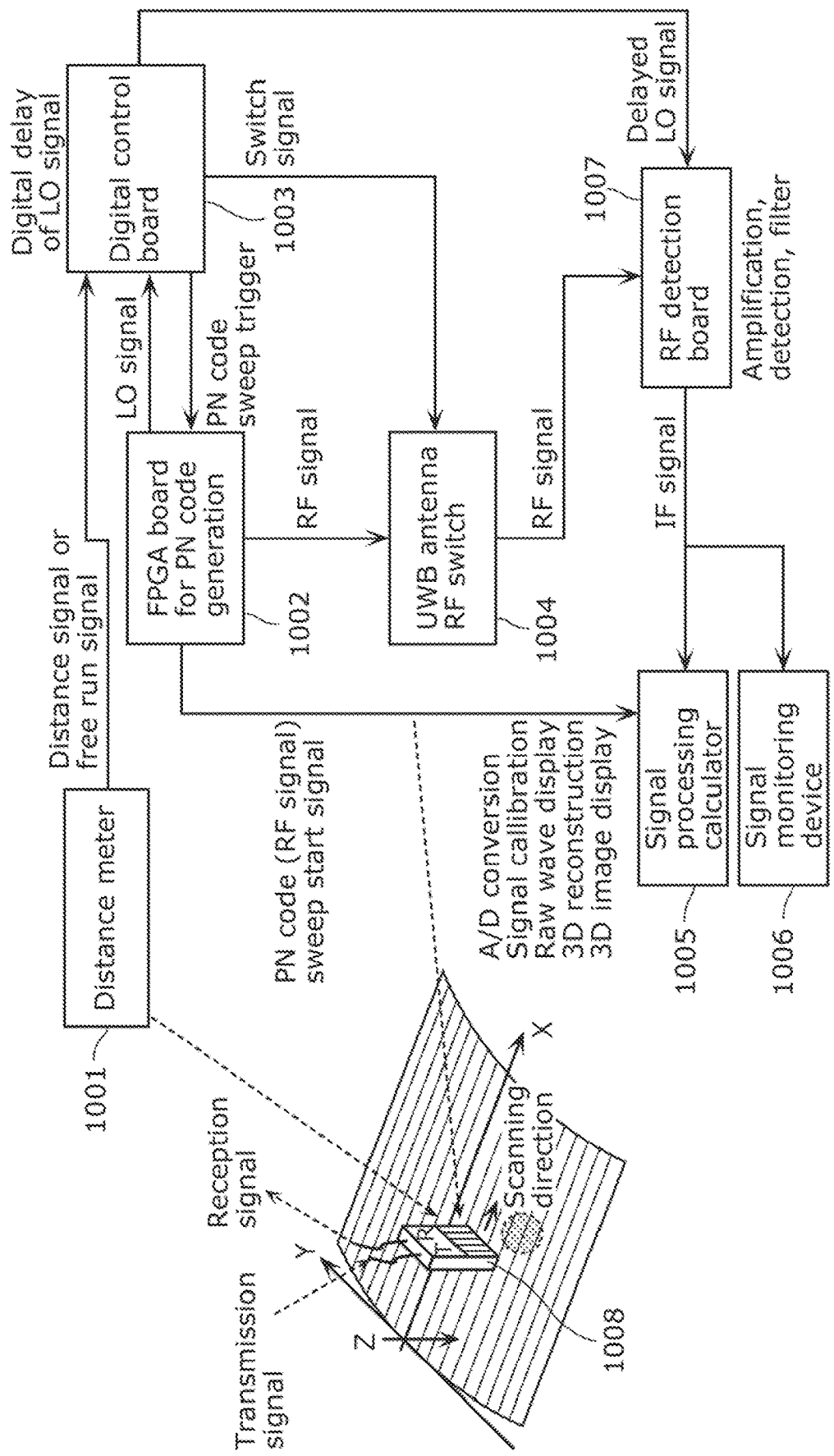
FIG. 8 illustrates the overall system configuration of a multistatic radar array according to an embodiment of the present disclosure.

FIG. 8 illustrates the overall system configuration of a multistatic radar array.

The microwave signal is a pseudo-random time-series signal (pseudo noise code (PN code)) with a frequency component of DC to 20 GHz. This signal is output from FPGA board 1002 for PN code generation. More specifically, there are two types of this signal. One type of the signal (local oscillator signal (LO signal)) is transmitted to an RF detection circuit (RF detection board 1007) through a delay circuit (digital control board 1003).

The other type of the signal (radio frequency signal (RF signal)) is transmitted to and radiated from a transmitting microwave UWB antenna of multistatic antenna array 1008. Scattered signals of the microwaves are received by the receiving UWB antenna of multistatic antenna array 1008 and transmitted to the RF detection circuit (RF detection board 1007). Here, the signals to be transmitted and received pass through an antenna element selection switch (UWB antenna RF switch 1004).

The signal to be delayed (the LO signal) is delayed by $\frac{1}{2}^n$ (n is an integer greater than 2) times the amount of time it takes for the PN code value to change. The detected signal is A/D converted by signal processing calculator 1005 as an intermediate frequency signal (IF signal) and stored. The information indicating the detected signal may be displayed on signal monitoring device 1006.

The timing of these series of operations is controlled by a microprocessor in digital control board 1003 so as to synchronize with a signal (distance signal or free run signal) from distance meter 1001. For example, the microprocessor in digital control board 1003 transmits a switch signal and a PN code sweep trigger and the like.

Signal processing calculator 1005 performs three-dimensional reconstruction using the A/D converted and stored signals, and displays three-dimensional images. Signal processing calculator 1005 may also perform signal calibration. Signal processing calculator 1005 may also display the raw waveform.

Next, the UWB antenna will be described.

Figure 9:
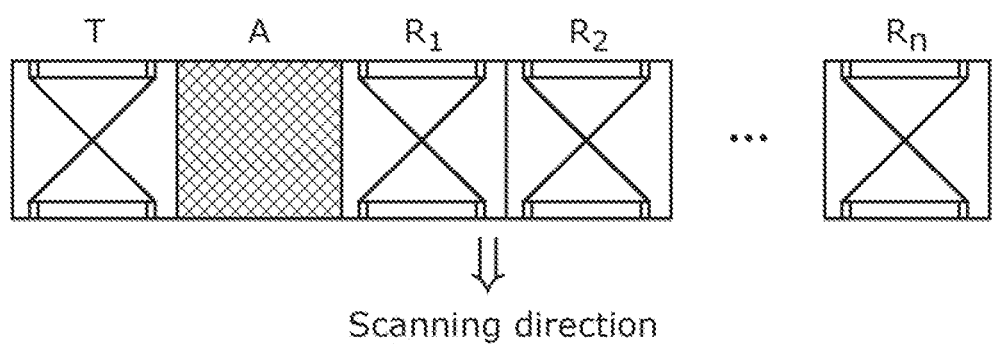
FIG. 9 illustrates an antenna array arranged in a single row on a straight or curved line according to an embodiment of the present disclosure.

FIG. 9 illustrates an antenna array arranged in a single row on a straight or curved line. In FIG. 9, the antenna array is a linear antenna array with n+1 antenna elements arranged in a line. Among the n+1 antenna elements, one is for transmitting and n are for receiving. In FIG. 9, the one antenna element for transmitting is labeled T, and the n antenna elements for receiving are labeled R ($R_1$, $R_2$, ..., $R_n$).

In FIG. 9, the area labeled A corresponds to a radio wave absorber. Performance as a UWB antenna is improved by placing the radio wave absorber between the transmitting antenna element and the receiving antenna element. T and R are interchangeable such that among the n+1 antenna elements, n may be for transmitting and one may be for receiving. Equivalent scattered data can be obtained even if T and R are exchanged.

The numerical value of n may be changed depending on the object to be tested. The scanning direction corresponds to the direction of the arrow in FIG. 9. For example, when projected onto a plane with z=0, the direction in which the plurality of antenna elements of the antenna array are arranged is defined as the y-axis direction, and the scanning direction is defined as the x-axis direction. In this example, the scattered data is measured by shifting the line scanned by the antenna array little by little (e.g., by shifting the line in the y-axis direction by ½ the size of the antenna element), which requires more time for the measurement but improves resolution.

Figure 10:
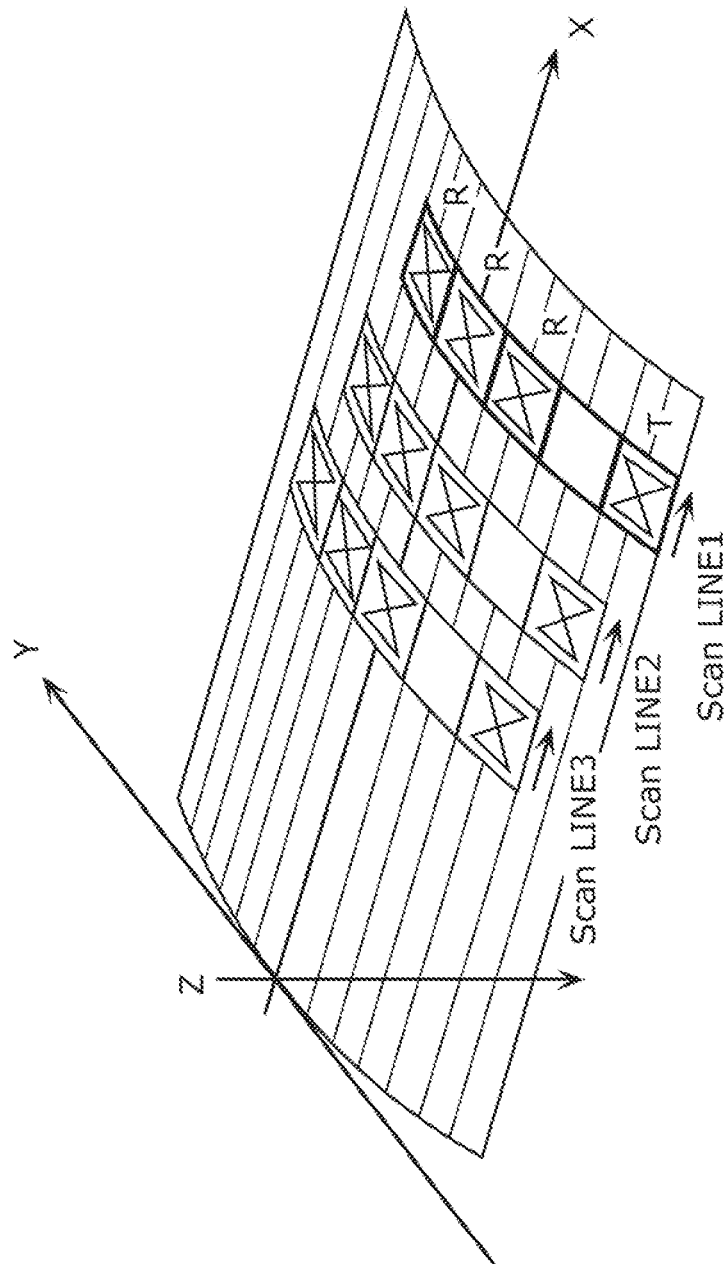
FIG. 10 illustrates a scanning method performed by an antenna array according to an embodiment of the present disclosure.

FIG. 10 illustrates a scanning method performed by the antenna array illustrated in FIG. 9. The antenna array in FIG. 10 includes one transmitting antenna element and three receiving antenna elements. The antenna array is scanned by shifting the line in the y-axis direction by ½ the size of the antenna element, such as shifting from scan LINE1 to scan LINE2 to scan LINE3 and so on until scan LINEn.

Figure 11:
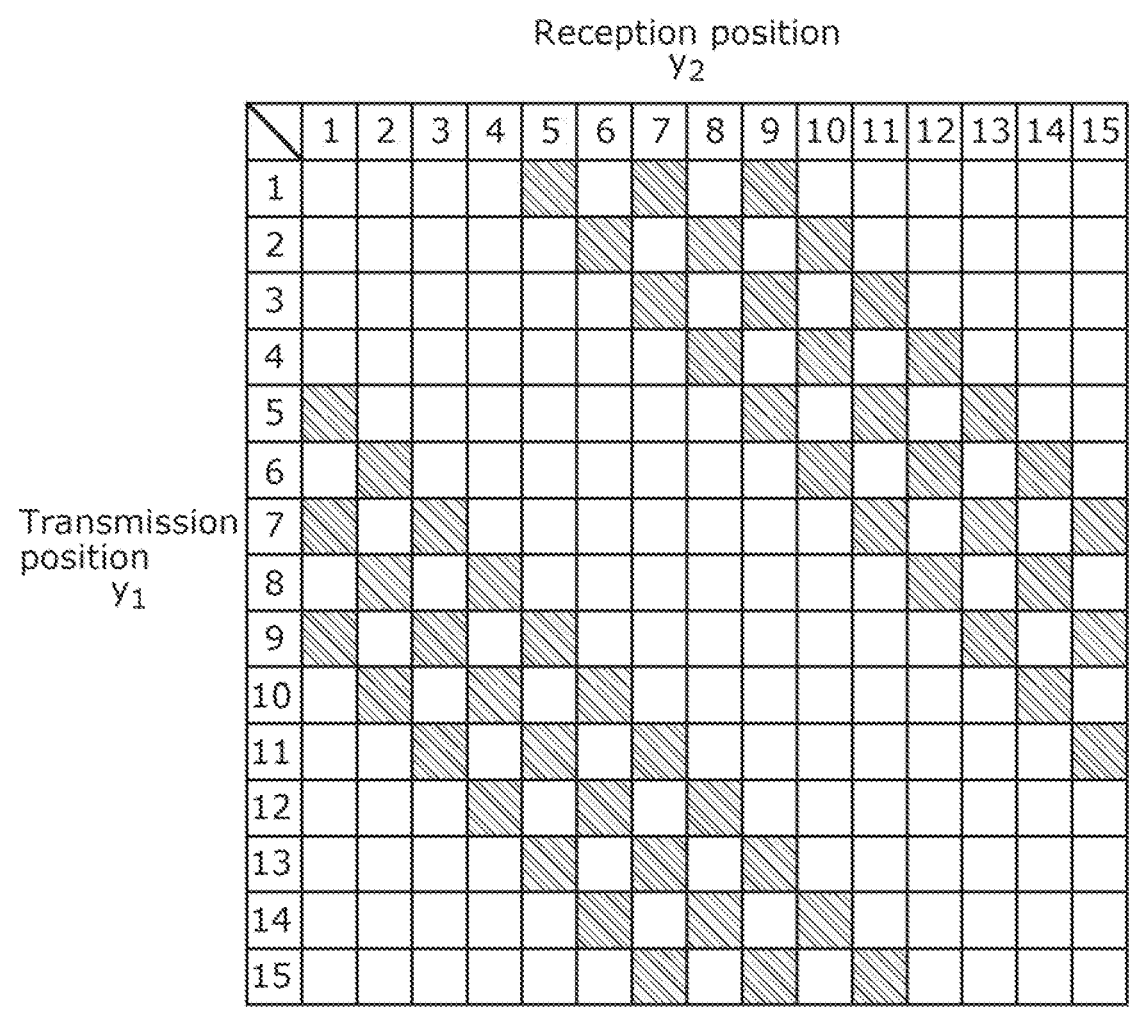

FIG. 11 illustrates the measurement points in the scanning method illustrated in FIG. 10. More specifically, the combination of the Y coordinate of the transmission position and the Y coordinate of the reception position where the scattered data is measured by shifting the scanning line of the antenna array including one transmitting antenna element and three receiving antenna elements by ½ the size of the antenna element in the y-axis direction is shown in shaded lines. The Y coordinate of transmission position is expressed as $y_1$, and the Y coordinate of reception position is expressed as $y_2$.

The length of one side of one block corresponds to ½ of the size of the antenna element, and the numerical values representing each of $y_1$ and $y_2$ are expressed in units of ½ the size of the antenna element. Thus, for example, if the Y coordinate of the transmitting antenna element is 1, the three Y coordinates of the three receiving antenna elements are 5, 7, and 9. For example, if the Y coordinate of the transmitting antenna element is 2, the three Y coordinates of the three receiving antenna elements are 6, 8, and 10.

The same scattered data can be obtained even if the positions of the transmitting antenna element and the receiving antenna element are swapped. Therefore, matrix $(y_1, y_2)$ is symmetric. The left side of the diagonal is also filled in as measurement points. Scattered data obtained in this way is used for image reconstruction.

Figure 12:
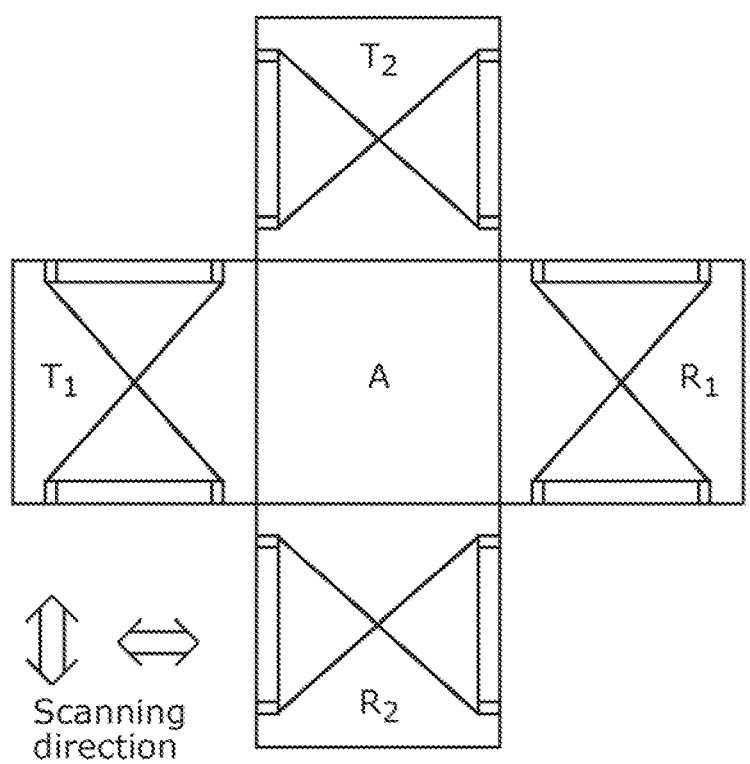
FIG. 12 illustrates an implementation example of a monostatic antenna capable of measuring radio waves with respect to both of the two polarization directions according to an embodiment of the present disclosure.

FIG. 12 illustrates an implementation example of a monostatic antenna capable of measuring radio waves with respect to both of the two orthogonal polarization directions.

In FIG. 12, a radio wave absorber labeled A is disposed both between the transmitting antenna element labeled $T_1$ and the receiving antenna element labeled $R_1$, and between the transmitting antenna element labeled $T_2$ and the receiving antenna element labeled $R_2$. The combination of $T_1$ and $R_1$ and the combination of $T_2$ and $R_2$ are then used to measure the scattered data.

The above configuration makes it possible to measure scattered data corresponding to two polarization directions. For example, it is possible to obtain information on matter that reacts to a particular polarization direction. The above configuration can achieve a monostatic antenna in which a plurality of transmitting antenna elements and a plurality of receiving antenna elements correspond one-to-one.

Note that the scanning direction may correspond to two orthogonal directions, as shown by the arrows in the figure.

IV. PSEUDO-DIFFERENTIAL OPERATOR

Next, pseudo-differential operators in partial differential equation theory will be described. In this section, we deal with functions in an n-dimensional Euclidean space $R^n$. Accordingly, the symbols shown in (4-1) below are used.

$$x=(x_1,x_2,\ldots,x_n)$$

$$y=(y_1,y_2,\ldots,y_n)$$

$$\xi=(\xi_1,\xi_2,\ldots,\xi_n)$$

$$\alpha=(\alpha_1,\alpha_2,\ldots,\alpha_n)$$

$$D^\alpha=(-i\partial_1)^{\alpha_1}\ldots(-i\partial_n)^{\alpha_n}$$

... (4-1) [Math. 70]

The linear differential operator of the constant coefficient is assumed to be as shown in (4-2) below.

[Math. 71]

$$P(D) = \sum_\alpha a_\alpha D^\alpha \qquad (4-2)$$

Letting the linear differential operator in (4-2) operate on a smooth function u with compact support on $R^n$ yields (4-3) shown below.

[Math. 72]

$$P(D)u(x) = \sum_\alpha a_\alpha D^\alpha u(x) \qquad (4-3)$$

It is well known that the Fourier transform of (4-3) leads to a simple multiplication by a polynomial called a symbol. This polynomial is shown in (4-4) below.

[Math. 73]

$$P(\xi) = \sum_\alpha a_\alpha \xi^\alpha \qquad (4-4)$$

The inverse Fourier transform of both sides of the equation in (4-4) yields (4-5).

[Math. 74]

$$P(D)u = \frac{1}{(2\pi)^n} \int_{R^n}\int_{R^n} e^{i(x-y)\xi} P(\xi)u(y)dyd\xi \qquad (4-5)$$
$$= \frac{1}{(2\pi)^n} \int_{R^n} e^{ix\cdot\xi} P(\xi)\tilde{u}(\xi)d\xi$$

We generalize (4-5) and define the operator $P(x, D)$, which can be applied to a case where the symbol is a general polynomial involving x, as shown in (4-6) below.

[Math. 75]

$$P(x, D)u = \frac{1}{(2\pi)^n} \int_{R^n} e^{ix\cdot\xi} P(x, \xi)\tilde{u}(\xi)d\xi \qquad (4-6)$$

$P(x, D)$ in (4-6) is called a pseudo-differential operator. The partial differential equation expressed as shown in (4-7) is solved for $u(x)$.

$$P_1(D)u(x)=P_2(D)f(x)$$

(4-7) [Math. 76]

The Fourier transform of both sides of the equation in (4-7) yields (4-8).

$$P_1(\xi)\tilde{u}(\xi)=P_2(\xi)\tilde{f}(\xi)$$

... (4-8) [Math. 77]

A relational expression like that in (4-9) shown below can be obtained from (4-8).

[Math. 78]

$$P(\xi)\tilde{u}(\xi) = \frac{P_1(\xi)}{P_2(\xi)}\tilde{u}(\xi) = \tilde{f}(\xi) \qquad (4-9)$$

The inverse Fourier transform of (4-9) is expressed as shown in (4-10) below.

[Math. 79]

$$P(D)u = \frac{1}{(2\pi)^n} \int_{R^n} e^{ix\cdot\xi} \frac{P_1(\xi)}{P_2(\xi)}\tilde{u}(\xi)d\xi = f(x) \qquad (4-10)$$

P(D) in (4-10) is also a pseudo-differential operator and can be written as shown in (4-11) below.

[Math. 80]

$$P(D) = \frac{P_1(D)}{P_2(D)} \quad (4\text{-}11)$$

As shown above, the pseudo-differential operator makes it possible to introduce concepts such as rational polynomials and non-integer powers of ordinary differential operators.

V. DIELECTRIC DISPERSION SIMULATION

Next, a simulation related to the effects of dielectric dispersion will be presented.

<V-1. Wave Equation for Dispersive Medium>

We consider a case where the dispersive nature of a medium can be written using a Debye model in the simulation.

The simulation is performed for monostatic cases. The propagation of electromagnetic waves (radio waves) in a one-dimensional space with a dispersive dielectric constant can be written using a pseudo-differential equation like that in (5-1) below.

[Math. 81]

$$\left[\partial_x^2 - \frac{4\partial_t^2}{c_0^2}\left(a + \frac{b}{1 - \alpha\partial_t^2}\right)\right]\phi(x, t) = 0 \quad (5\text{-}1)$$

$c_0$ is the speed of electromagnetic waves (radio waves) in vacuum. The (factor of) 4 of the time differential term is based on the fact that a wave passes through the same path twice in monostatic inverse scattering.

Figure 13:
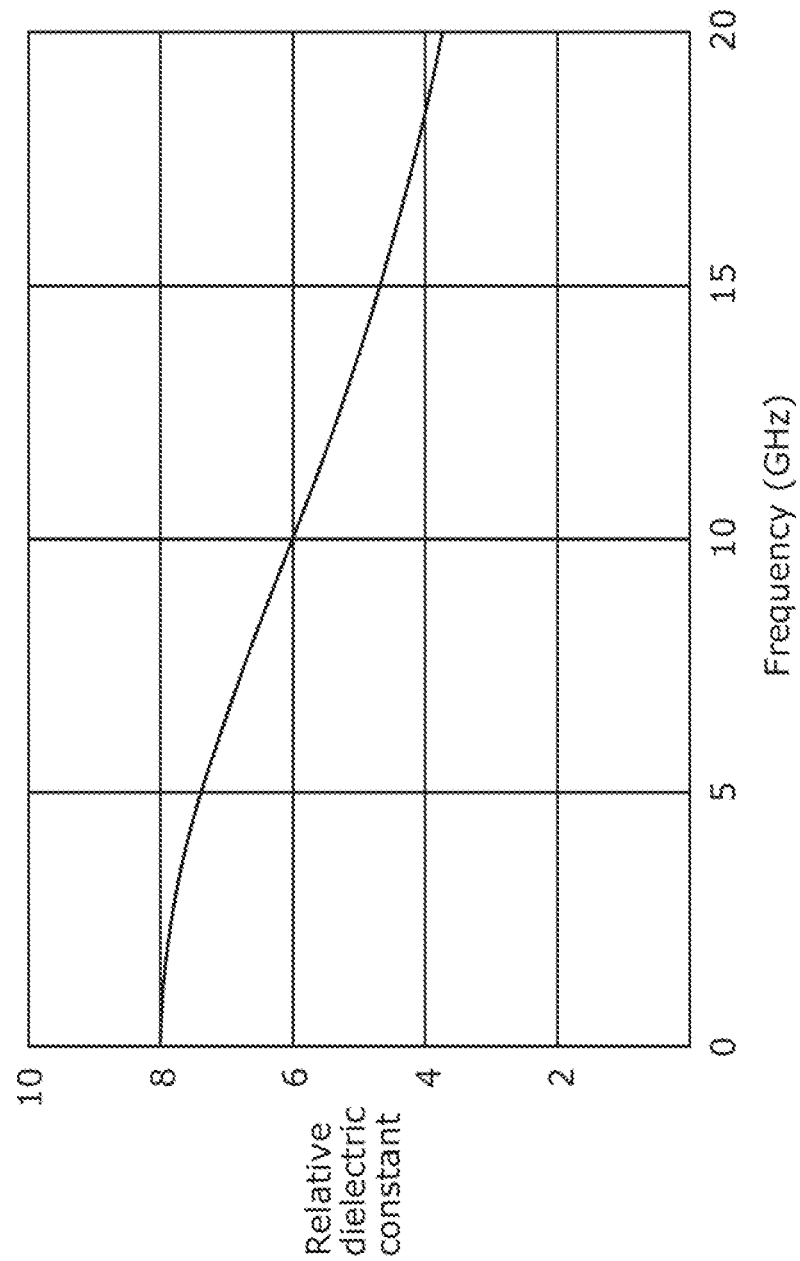
FIG. 13 illustrates the relationship between the relative dielectric constant and frequency when the dielectric constant dispersion is great.
Figure 14A:
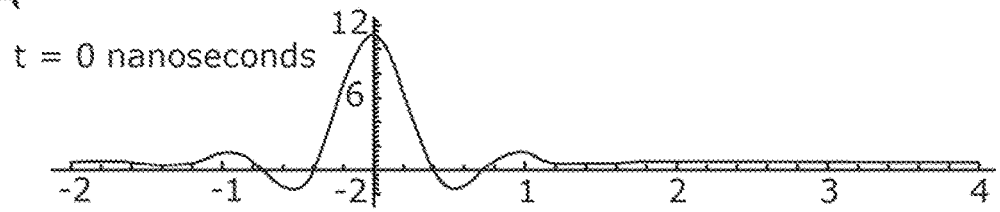
FIG. 14A illustrates the result of a simulation of radio waves at t=0 nanoseconds.
Figure 14B:
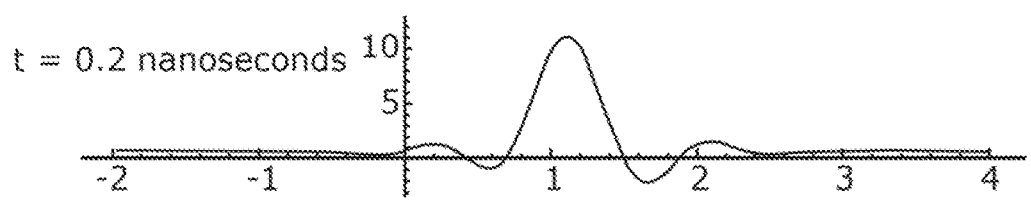
FIG. 14B illustrates the result of a simulation of radio waves at t=0.2 nanoseconds.
Figure 14C:
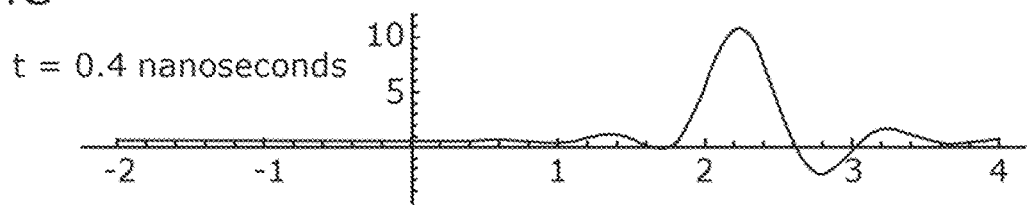
FIG. 14C illustrates the result of a simulation of radio waves at t=0.4 nanoseconds.
Figure 14D:
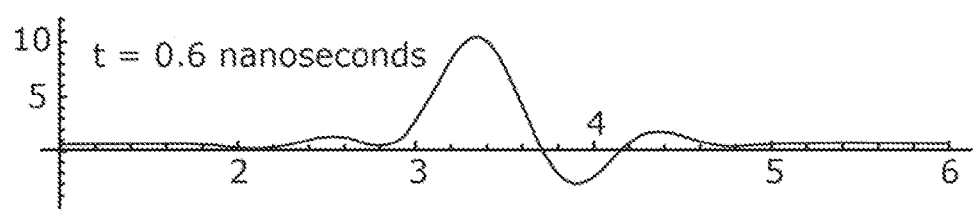
FIG. 14D illustrates the result of a simulation of radio waves at t=0.6 nanoseconds.
Figure 14E:
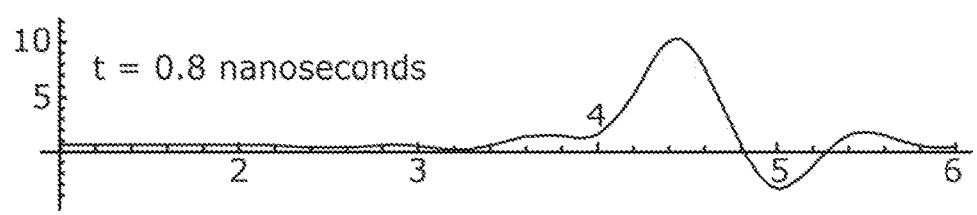
FIG. 14E illustrates the result of a simulation of radio waves at t=0.8 nanoseconds.

FIG. 13 illustrates the relationship between the relative dielectric constant and frequency when the dielectric constant dispersion is great. The relationship between the relative dielectric constant and frequency illustrated in FIG. 13 is based on a=1, b=7, and α=0.0001.

FIG. 14A, FIG. 14B, FIG. 14C, FIG. 14D, and FIG. 14E illustrate simulation results of radio waves in the presence of dielectric dispersion. Amplitude is represented on the vertical axis and distance x (cm) is represented on the horizontal axis. In each figure, time t=0.2n nanoseconds (where n=0, 1, 2, 3, and 4 for the respective figures). One can see from FIG. 14A, FIG. 14B, FIG. 14C, FIG. 14D, and FIG. 14E that the bell-shaped waveform collapses over time.

<V-2. Reconstruction in a Medium with Dielectric Dispersion>

Next we will consider monostatic inverse scattering analysis. The equation for the inverse scattering problem is shown in (6-1) below.

$$(\partial_x^2 + \partial_y^2 + \partial_z^2 + 4k^2)\phi = 0$$

... (6-1)   [Math. 82]

The relationship between the wavenumber k and the angular frequency ω is given by (6-2) shown below.

[Math. 83]

$$k = \frac{\omega}{c_0}\sqrt{a + \frac{b}{1 + \alpha\omega^2}} \quad (6\text{-}2)$$

Hereinafter, we show what happens when dielectric dispersion is ignored and inverse analysis is performed, based on the results of measuring scattered data by emitting radio waves in a medium with dielectric dispersion.

Figure 15:
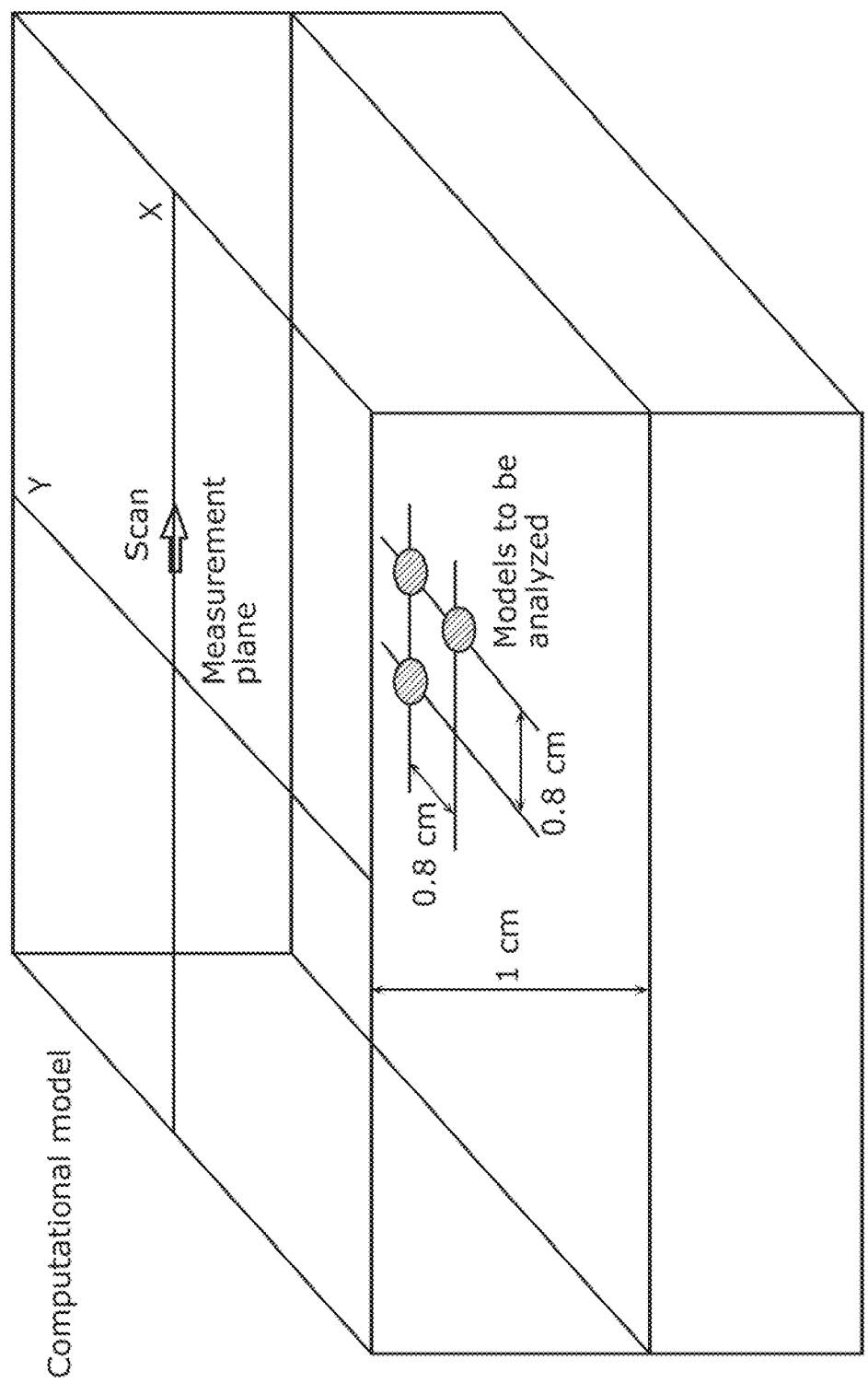
FIG. 15 illustrates a computational model of a reconstruction simulation.

FIG. 15 illustrates a computational model. The models to be analyzed in the computational model are three points spaced 0.8 cm apart from each other in a plane at a depth of 1 cm in a three-dimensional space. In this computational model, the number of measurement points in x-axis direction is NX=128, the number of measurement points in y-axis direction is NY=64, the spacing of measurement points in the x-axis direction is dx=0.1 cm, and the spacing of measurement points in the y-axis direction is dy=0.1 cm.

Figure 16A:
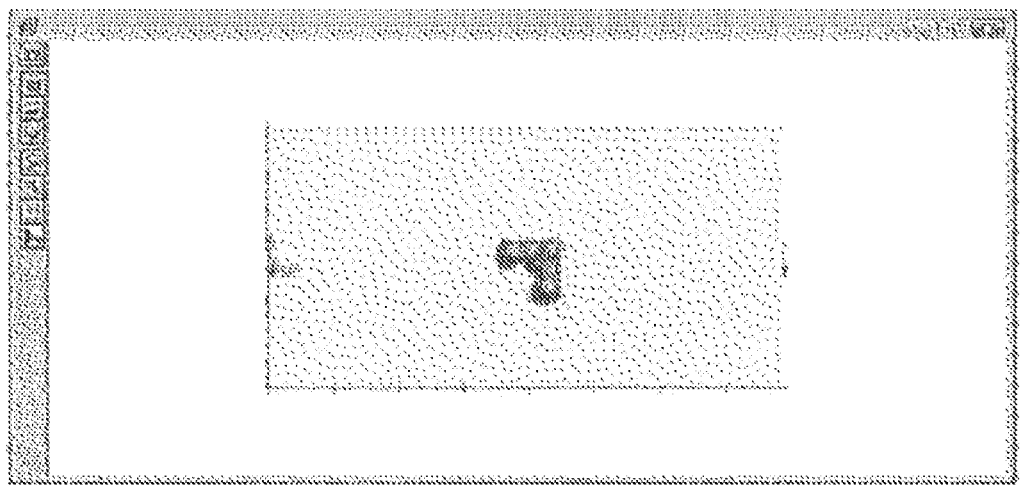
FIG. 16A is an XY plan view of the result of a simulation in a first case.
Figure 16B:
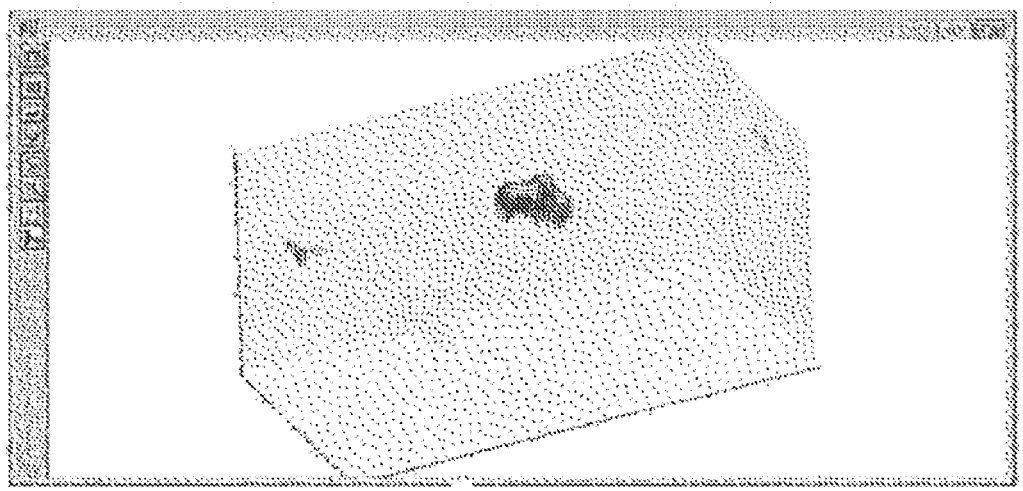
FIG. 16B is a perspective view of the result of the simulation in the first case.

FIG. 16A is an XY plan view at z (depth)=1 cm of the result of a simulation in a first case, and FIG. 16B is a perspective view of the result of the simulation in the first case. More specifically, FIG. 16A and FIG. 16B illustrate the result of a simulation with a relative dielectric constant of 7.5 at 5 GHz and a relative dielectric constant of 5.0 at 14 GHz.

Figure 17A:
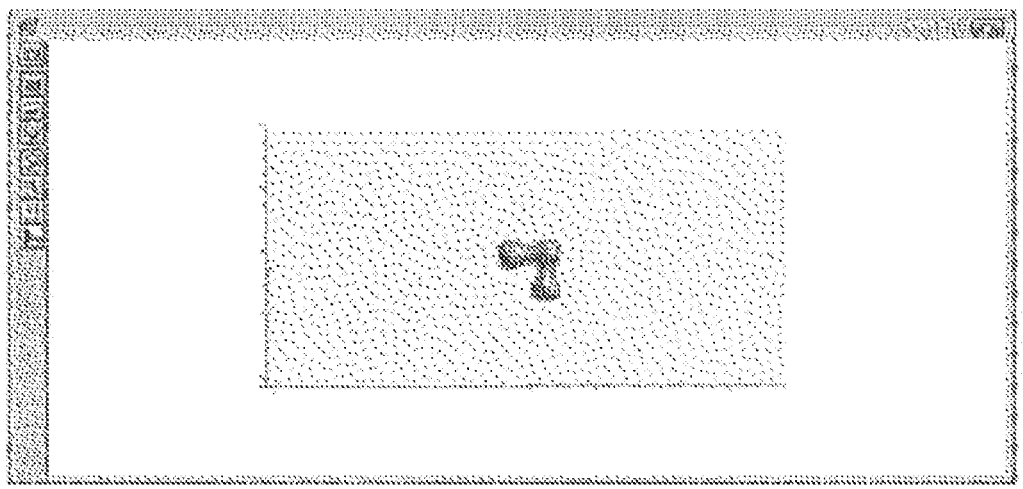
FIG. 17A is an XY plan view of the result of a simulation in a second case.
Figure 17B:
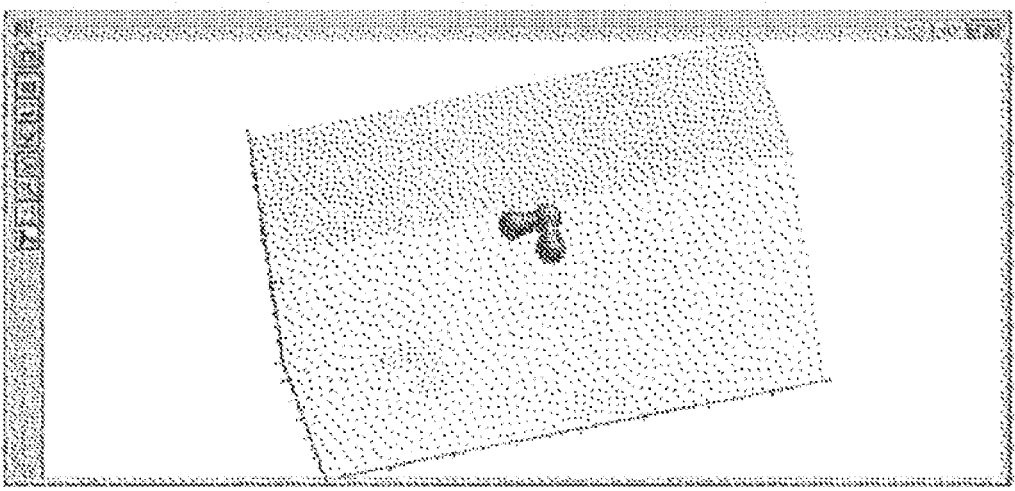
FIG. 17B is a perspective view of the result of the simulation in the second case.

FIG. 17A is an XY plan view at z (depth)=1 cm of the result of a simulation in a second case, and FIG. 17B is a perspective view of the result of the simulation in the second case. More specifically, FIG. 17A and FIG. 17B illustrate the result of a simulation with a relative dielectric constant of 6.5 at 5 GHz and a relative dielectric constant of 5.5 at 14 GHz.

Figure 18A:
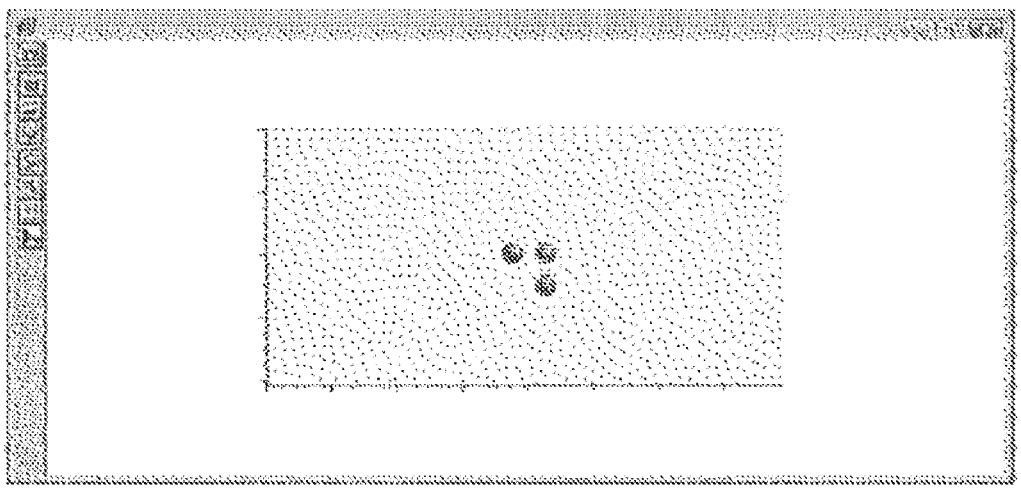
FIG. 18A is an XY plan view of the result of a simulation in a third case.
Figure 18B:
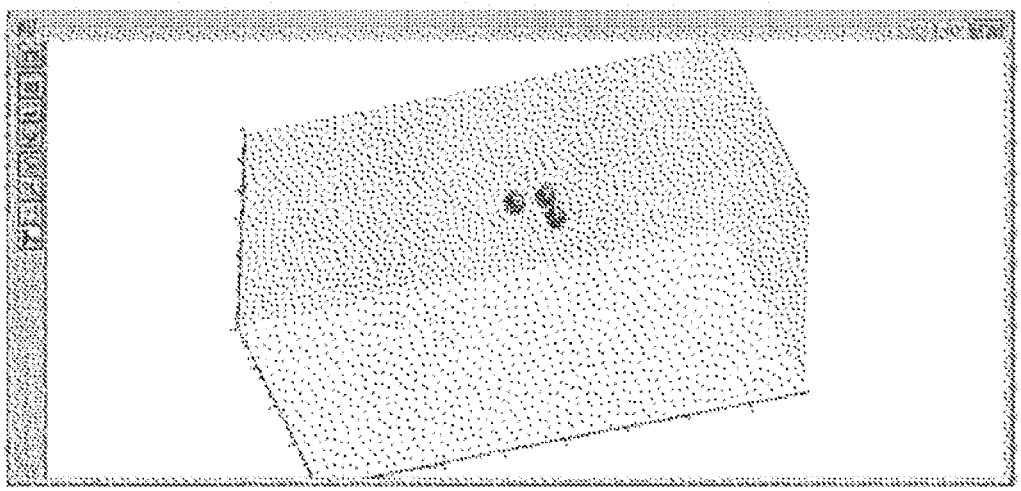
FIG. 18B is a perspective view of the result of the simulation in the third case.

FIG. 18A is an XY plan view at z (depth)=1 cm of the result of a simulation in a third case, and FIG. 18B is a perspective view of the result of the simulation in the third case. More specifically, FIG. 18A and FIG. 18B illustrate the result of a simulation with a relative dielectric constant of 6 at 5 GHz and a relative dielectric constant of 6 at 14 GHz.

The result of the third simulation corresponds to the result of inverse scattering analysis in a medium without dielectric dispersion. The result of measuring the dielectric constant in a tissue of a normal living body (breast) is similar to the dispersion in the second case. Ignoring dielectric dispersion clearly reduces the resolution of the image.

The above analysis corresponds to a monostatic scattering field analysis. However, the same can be applied to a multistatic scattering field analysis. It is therefore important to take dielectric dispersion into consideration in scattering field analysis.

VI. CONCLUSION

The following is a brief description, based on what has been described above, of the configuration and operation of a scattering tomography device that generates an image of the interior of an object using scattered waves of radio waves.

Figure 19:
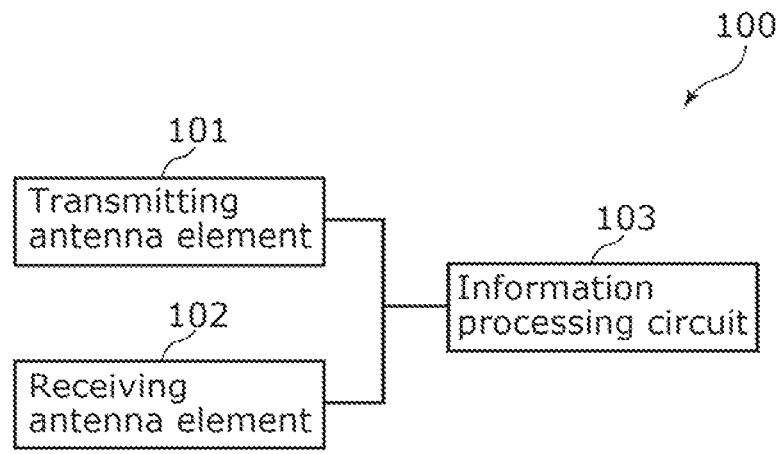
FIG. 19 is a block diagram of a basic configuration of a scattering tomography device according to an embodiment of the present disclosure.

FIG. 19 illustrates a basic configuration of the scattering tomography device according to the present embodiment. Scattering tomography device 100 illustrated in FIG. 19 includes transmitting antenna element 101, receiving antenna element 102, and information processing circuit 103.

Transmitting antenna element 101 is a circuit that transmits radio waves. More specifically, transmitting antenna element 101 transmits radio waves into the interior of an object from outside the object. For example, the radio waves may be microwaves, millimeter waves, or terahertz waves. For example, the living body may be a manufactured object or a natural material. In particular, the object may be a breast. Scattering tomography device 100 may include a plurality of transmitting antenna elements 101.

Receiving antenna element 102 is a circuit that receives radio waves which are, for example, scattered waves of radio waves. More specifically, receiving antenna element 102 receives, outside the object, scattered waves of the radio waves transmitted into the interior of the object. Scattering tomography device 100 may include a plurality of receiving antenna elements 102. Receiving antenna element 102 may be disposed in essentially the same position as transmitting antenna element 101, and, alternatively, may be disposed in a different position than transmitting antenna element 101.

Transmitting antenna element 101 and receiving antenna element 102 may constitute a multistatic antenna and, alternatively, may constitute a monostatic antenna.

Information processing circuit 103 is a circuit that performs information processing. More specifically, information processing circuit 103 generates an image of the interior of the object using the measurement data indicating the scattered waves received by receiving antenna element 102. Information processing circuit 103 may be a computer or a processor included in a computer. Information processing circuit 103 may perform the information processing by reading a program from memory and executing the program. Information processing circuit 103 may be a dedicated circuit that generates the image of the interior of the object using the measurement data.

For example, information processing circuitry 103 may correspond to one or more of the plurality of elements illustrated in FIG. 8. More specifically, for example, information processing circuit 103 may correspond to signal processing calculator 1005. Information processing circuit 103 may also display the generated image on a display device, such as a liquid crystal display device.

Figure 20:
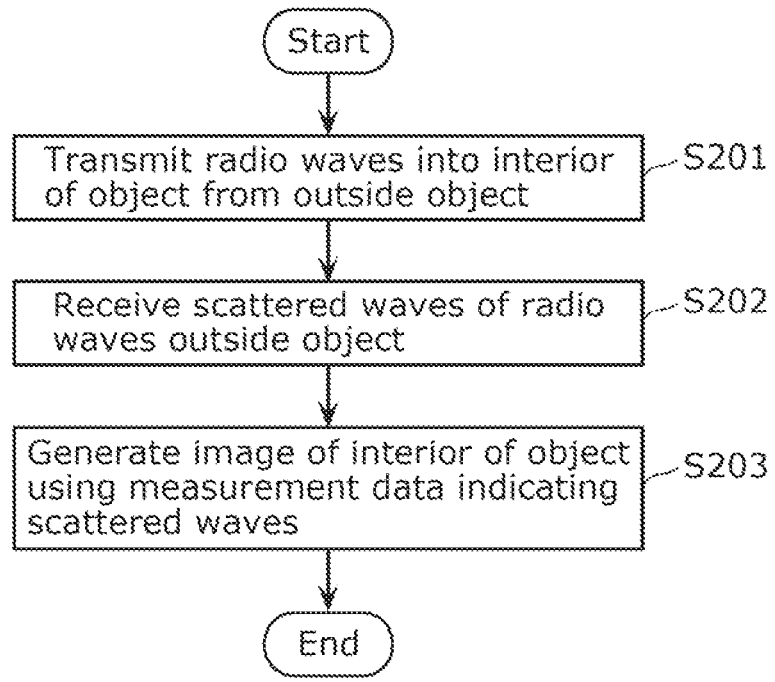
FIG. 20 is a flowchart showing the basic operation of a scattering tomography device according to an embodiment of the present disclosure.

FIG. 20 is a flowchart showing the basic operation of scattering tomography device 100 illustrated in FIG. 19. Specifically, transmitting antenna element 101, receiving antenna element 102, and information processing circuit 103 included in scattering tomography device 100 illustrated in FIG. 19 operate as shown in FIG. 20.

First, transmitting antenna element 101 transmits radio waves into the interior of an object from outside the object (S201). Next, receiving antenna element 102 receives, outside the object, scattered waves of the radio waves transmitted into the interior of the object (S202). Information processing circuit 103 generates an image of the interior of the object using the measurement data indicating the scattered waves received by receiving antenna element 102 (S203).

Upon generating an image using the measurement data, information processing circuit 103 first derives, using the measurement data, a relational expression that satisfies an equation whose solution is a scattering field function. Inputs of the scattering field function are a reception position of the scattered waves and a transmission position of the radio waves, and an output of the scattering field function is an amount of the scattered waves at the reception position. Stated differently, the scattering field function is a function that indicates the amount of scattered waves at the reception position for discretionarily defined transmission and reception positions.

Then, information processing circuit 103 derives an image function using the derived relational expression. The image function is a function for generating an image, and is a function that includes one or more parameters that indicate the correspondence between a change in frequency of the radio waves and a change in the dielectric constant of the object in accordance with Debye relaxation. Information processing circuit 103 then generates an image of the interior of the object using the image function.

This enables scattering tomography device 100 to derive a relational expression for deriving an image function based on the scattering field function, which indicates the amount of scattered waves depending on the transmission position and the reception position, and the measurement data of the scattered waves received by receiving antenna element 102. In addition, the image function includes one or more parameters that indicate the correspondence between a change in frequency of the radio waves and a change in the dielectric constant of the object. Accordingly, the correspondence between a change in frequency and a change in the dielectric constant can be reflected in the generation of an image showing the interior of an object by scattering tomography device 100.

In other words, scattering tomography device 100 can generate a highly accurate image of the interior of an object using scattered waves of radio waves.

For example, the elements, equations, variables and the like presented in the present embodiment may be applied to transmitting antenna element 101, receiving antenna element 102, information processing circuit 103, the scattering field functions, equations, relational expressions, image functions, parameters and the like presented in the above basic configuration and basic operation.

The scattering field functions, equations, relational expressions, and image functions shown in the present embodiment may be applied in a modified form as appropriate. For example, other formulas that include substantially the same content as the formulas described above may be used, and other formulas that are derived based on the theories described above may be used.

For example, radio waves include a plurality of frequency components. The radio waves may be pulsed waves, and, alternatively, may not be pulsed waves.

Supplemental Information

Hereinbefore, an aspect of the scattering tomography device has been described based on an embodiment, but aspects of the scattering tomography device are not limited to the embodiment. Various modifications conceivable by those skilled in the art may be made to the embodiment, and elements in the embodiment may be combined discretionarily. For example, a process executed by a specific element in the embodiment may be executed by a different element instead. Moreover, the processing order of the processes may be changed, and the processes may be performed in parallel.

A scattering tomography method including steps performed by the elements included in the scattering tomography device may be executed by an arbitrary device or system. For example, part or all of the scattering tomography method may be executed by a computer including, for example, a processor, memory, and an input/output circuit. In such cases, the scattering tomography method may be executed by a program for causing a computer to execute the scattering tomography method being executed by the computer.

The program may be recorded on a non-transitory computer-readable recording medium.

Each of the elements of the scattering tomography device may be configured in the form of dedicated hardware, in the form of general-purpose hardware that executes the above program or the like, or any combination thereof. For example, the general-purpose hardware may be configured in the form of memory on which a program is recorded and a general-purpose processor that reads the program from the memory and executes the program. Here, the memory may be semiconductor memory or a hard disk, and the general-purpose processor may be a central processing unit (CPU) or the like.

The dedicated hardware may be configured in the form of memory and a dedicated processor or the like. For example, the dedicated processor may reference the memory for recording the measurement data and execute the scattering tomography method described above.

Each of the elements of the scattering tomography device may be an electrical circuit. The electrical circuits may collectively form a single electrical circuit and, alternatively, may form individual electrical circuits. These electrical circuits may correspond to dedicated hardware or general-purpose hardware that executes the above program, for example.

INDUSTRIAL APPLICABILITY

One aspect of the present disclosure is useful as a scattering tomography device and the like that generates an image of the interior of an object using scattered waves of radio waves, and is applicable in, for example, geophysical prospecting or medical diagnosis.

REFERENCE SIGNS LIST

100 scattering tomography device
101 transmitting antenna element
102 receiving antenna element
103 information processing circuit
300 measurement apparatus
301 vector network analyzer
302 computer
303 GPIB cable
304 high-frequency coaxial cable
305 excised sample
306 probe for measuring the dielectric constant
401 antenna array
601 monostatic antenna
1001 distance meter
1002 FPGA board for PN code generation
1003 digital control board
1004 UWB antenna RF switch
1005 signal processing calculator
1006 signal monitoring device
1007 RF detection board
1008 multistatic antenna array

The invention claimed is:

1. A scattering tomography device comprising:
a transmitting antenna element that transmits radio waves into an interior of an object from outside the object;
a receiving antenna element that receives, outside the object, scattered waves of the radio waves transmitted into the interior of the object; and
an information processing circuit that generates an image of the interior of the object using measurement data indicating the scattered waves received by the receiving antenna element,
wherein the information processing circuit:
derives, using the measurement data, a relational expression that satisfies an equation whose solution is a scattering field function that takes a transmission position of the radio waves and a reception position of the scattered waves as inputs and outputs an amount of the scattered waves at the reception position;
derives, using the relational expression, an image function that is for generating the image and includes one or more parameters indicating a correspondence between a change in frequency of the radio waves and a change in a dielectric constant of the object in accordance with Debye relaxation; and
generates the image using the image function.

2. The scattering tomography device according to claim 1, wherein in a three-dimensional space of X coordinates, Y coordinates, and Z coordinates, an X coordinate of a position of the transmitting antenna element is identical to an X coordinate of a position of the receiving antenna element, and
the scattering field function is defined as:

[Math. 1]

$$\phi(x, y_1, y_2, z_1, z_2, \omega) = \iint \int_D \frac{e^{ik\rho_1}}{\rho_1} \frac{e^{ik\rho_2}}{\rho_2} \varepsilon(\xi, \eta, \zeta) d\xi d\eta d\zeta$$
$$\rho_1 = \sqrt{(x-\xi)^2 + (y_1-\eta)^2 + (z_1-\zeta)^2}$$
$$\rho_2 = \sqrt{(x-\xi)^2 + (y_2-\eta)^2 + (z_2-\zeta)^2}$$

where x is an X coordinate of the transmission position and the reception position, $y_1$ is a Y coordinate of the transmission position, $y_2$ is a Y coordinate of the reception position, $z_1$ is a Z coordinate of the transmission position, $z_2$ is a Z coordinate of the reception position, ω is an angular frequency of the radio waves, D is a region including matter that generates the scattered waves by reflecting the radio waves, ξ is an X coordinate of a position in the region, η is a Y coordinate of the position in the region, ∂ is a Z coordinate of the position in the region, ε(ξ, η,∂) is a reflectivity, i is an imaginary unit, and k is a wavenumber of the radio waves.

3. The scattering tomography device according to claim 2, wherein the equation is defined as:

[Math. 2]

$$\left[\frac{1}{4}\Delta_5^2 - (ik)^2 \partial_x^2 - (\partial_{y_1}^2 + \partial_{z_1}^2)(\partial_{y_2}^2 + \partial_{z_2}^2)\right]\phi = 0$$
$$\Delta_5 = \partial_x^2 + \partial_{y_1}^2 + \partial_{y_2}^2 + \partial_{z_1}^2 + \partial_{z_2}^2$$

4. The scattering tomography device according to claim 3, wherein the relational expression is defined as:

[Math. 3]

$$\phi(x, y_1, y_2, z_1, z_2, k) =$$
$$\frac{1}{(2\pi)^3} \int_{-\infty}^{\infty} \int_{-\infty}^{\infty} \int_{-\infty}^{\infty} e^{-i(k_x x + k_{y_1} y_1 + k_{y_2} y_2)} a(k_x, k_{y_1}, k_{y_2}, k)$$
$$e^{is_1(k_x, k_{y_1}, k_{y_2})z_1} e^{is_2(k_x, k_{y_1}, k_{y_2})z_2} dk_x dk_{y_1} dk_{y_2}$$

where $k_x$ is a wavenumber related to x in the scattering field function, $k_{y_1}$ is a wavenumber related to $y_1$ in the scattering field function, and $k_{y_2}$ is a wavenumber related to $y_2$ in the scattering field function, a $(k_x, k_{y1}, k_{y2}, k)$ is defined as:

[Math. 4]

$$a(k_x, k_{y_1}, k_{y_2}, k) = \sum_{I,J} a_{I,J}(k_x, k_{y_1}, k_{y_2}, k) =$$

$$\sum_{I,J} e^{i(k_{y_1} y_I + k_{y_2} y_J)} e^{-is_1(k, k_x, k_{y_1}, k_{y_2}) z_1} e^{is_2(k_x, k_{y_1}, k_{y_2}) z_2} \Phi(k_x, y_I, y_J, k)$$

where I is an index of the transmission position at which the transmitting antenna element is present, J is an index of the reception position at which the receiving antenna element is present, $y_I$ is a Y coordinate of the transmission position at which the transmitting antenna element is present, $y_J$ is a Y coordinate of the reception position at which the receiving antenna element is present, $a_{I,J}(k_x, k_{y1}, k_{y2}, k)$ is a coefficient defined by the measurement data at $k_x$, $k_{y1}$, $k_{y2}$, and k, and $\Phi(k_x, y_I, y_J, k)$ is the measurement data at $k_x$, $y_I$, $y_J$, and k.

5. The scattering tomography device according to claim 4, wherein the image function is defined as:

[Math. 5]

$$\rho(x, y, z) = \int_{-\infty}^{\infty} \lim_{y_1 \to y_2 = y} [\phi(x, y_1, y_2, z, k)] d\omega$$

$$= \int_{-\infty}^{\infty} \frac{1}{(2\pi)^3} \int_{-\infty}^{\infty} \int_{-\infty}^{\infty} \int_{-\infty}^{\infty} e^{-i(k_x x + k_{y_1} y + k_{y_2} y)} e^{ik_z z}$$

$$a(k_x, k_{y_1}, k_{y_2}, k) \left(\frac{dk}{dk_z}\right)\left(\frac{d\omega}{dk}\right) dk_x dk_{y_1} dk_{y_2} dk_z$$

where x in the image function is an X coordinate of the image, y in the image function is a Y coordinate of the image, and z in the image function is a Z coordinate of the image, and variables included in an integrand in the image function are defined as:

[Math. 6]

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + \frac{(k_{y_1}^2 - k_{y_2}^2)^2}{k_x^2 + k_z^2} + 2(k_{y_1}^2 + k_{y_2}^2)}$$

$$\frac{dk}{dk_z} = \frac{k_z\sqrt{k^2 - k_{y_1}^2}\sqrt{k^2 - k_{y_2}^2}}{k(k_x^2 + k_z^2)}$$

$$\omega = \sqrt{\frac{-(a+b-c_0^2\alpha k^2) + \sqrt{(a+b-c_0^2\alpha k^2)^2 + 4a\alpha c_0^2 k^2}}{2a\alpha}}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

where $c_0$ is a propagation speed of the radio waves in vacuum, and a, b, and α are the one or more parameters.

6. The scattering tomography device according to claim 1, wherein the information processing circuit generates the image using the measurement data obtained at a position of the transmitting antenna element and a position of the receiving antenna element also as data obtained by swapping the position of the transmitting antenna element and the position of the receiving antenna element.

7. The scattering tomography device according to claim 1, wherein the scattering tomography device comprises a plurality of receiving antenna elements each of which is the receiving antenna element, and the information processing circuit generates the image using the measurement data indicating the scattered waves received at each of the plurality of receiving antenna elements included in the scattering tomography device.

8. The scattering tomography device according to claim 7, wherein the transmitting antenna element and the plurality of receiving antenna elements are aligned in a single row, the transmitting antenna element is positioned at an end of the single row in which the transmitting antenna element and the plurality of receiving antenna elements are aligned, and a radio wave absorber is disposed between (i) the transmitting antenna element and (ii) the plurality of receiving antenna elements.

9. The scattering tomography device according to claim 1, wherein in a three-dimensional space of X coordinates, Y coordinates, and Z coordinates, an X coordinate, a Y coordinate, and a Z coordinate of a position of the transmitting antenna element are identical to an X coordinate, a Y coordinate, and a Z coordinate of a position of the receiving antenna element, respectively, and the scattering field function is defined as:

[Math. 7]

$$\phi(x, y, z, k) = \int\int \frac{e^{ik\rho}}{\rho} \frac{e^{ik\rho}}{\rho} \varepsilon(\xi, \eta, \zeta) d\xi d\eta d\zeta$$

$$\rho = \sqrt{(x-\xi)^2 + (y-\eta)^2 + (z-\zeta)^2}$$

where x is an X coordinate of the transmission position and the reception position, y is an Y coordinate of the transmission position and the reception position, z is an Z coordinate of the transmission position and the reception position, D is a region including matter that generates the scattered waves by reflecting the radio waves, ξ is an X coordinate of a position in the region, η is a Y coordinate of the position in the region, ∂ is a Z coordinate of the position in the region, ε(ξ, η, ∂) is a reflectivity, i is an imaginary unit, and k is a wavenumber of the radio waves.

10. The scattering tomography device according to claim 9, wherein the equation is defined as:

$$(\partial_x^2 + \partial_y^2 + \partial_z^2 + 4k^2)\phi = 0 \quad \text{[Math. 8]}$$

11. The scattering tomography device according to claim 10, wherein the relational expression is defined as:

[Math. 9]

$$\phi(x, y, z, k) = \frac{1}{(2\pi)^2} \int_{-\infty}^{\infty} \int_{-\infty}^{\infty} e^{-ik_x x - ik_y y} a(k_x, k_y, k) e^{iz\sqrt{4k^2 - k_x^2 - k_y^2}} dk_x dk_y$$

where $k_x$ is a wavenumber related to x in the scattering field function and $k_y$ is a wavenumber related to y in the scattering field function, $a(k_x, k_y, k)$ is defined as:

[Math. 10]

$$a(k_x, k_y, k) = \sum_I e^{ik_x x_I} e^{-ik_z z_I} \tilde{\Phi}(x_I, k_y, k)$$
$$= \sum_I e^{ik_x x_I} e^{-ik_z f(x_I)} \tilde{\Phi}(x_I, k_y, k)$$

where I is an index of the transmission position and the reception position at which the transmitting antenna element and the receiving antenna element are present, $x_I$ is an X coordinate of the transmission position and the reception position at which the transmitting antenna element and the receiving antenna element are present, and $z_I$ and $f(x_I)$ are a Z coordinate of the transmission position and the reception position at which the transmitting antenna element and the receiving antenna element are present, and $\tilde{\Phi}(x_I, k_y, k)$ [Math. 11]

expresses the measurement data at $x_I$, $k_y$, and k.

12. The scattering tomography device according to claim 11,
wherein the image function is defined as:

$$\rho(x, y, z) = \frac{1}{(2\pi)^2} \int_0^\infty \int_{-\infty}^\infty \int_{-\infty}^\infty e^{-i(k_x x + k_y y)} a(k_x, k_y, k) e^{ik_z z} dk_x dk_y d\omega$$
$$= \frac{1}{(2\pi)^2} \int_0^\infty \int_{-\infty}^\infty \int_{-\infty}^\infty e^{-i(k_x x + k_y y) + ik_z z}$$
$$\left\{ \sum_I e^{ik_x x_I} e^{-ik_z f(x_I)} \tilde{\Phi}(x_I, k_y, k) \right\} \frac{d\omega}{dk} \frac{dk}{dk_z} dk_x dk_y dk_z$$

where x in the image function is an X coordinate of the image, y in the image function is a Y coordinate of the image, and z in the image function is a Z coordinate of the image, and
variables included in an integrand in the image function are defined as:

[Math. 13]

$$k_z = \sqrt{4k^2 - k_x^2 - k_y^2}$$
$$k = \frac{1}{2}\sqrt{k_x^2 + k_y^2 + k_z^2}$$
$$\frac{dk}{dk_2} = \frac{k_z}{4k}$$
$$\omega = \sqrt{\frac{-(a+b-c_0^2\alpha k^2) + \sqrt{(a+b-c_0^2\alpha k^2)^2 + 4a\alpha c_0^2 k^2}}{2a\alpha}}$$
$$\frac{d\omega}{dk} = \frac{c_0^2 k + \alpha c_0^2 \omega^2 k}{(a+b)\omega + 2a\alpha \omega^3 - \alpha c_0^2 \omega k^2}$$

where $c_0$ is a propagation speed of the radio waves in vacuum, and a, b, and α are the one or more parameters.

13. The scattering tomography device according to claim 1,
wherein the scattering tomography device comprises a plurality of transmitting antenna elements each of which is the transmitting antenna element and a plurality of receiving antenna elements each of which is the receiving antenna element,
the plurality of transmitting antenna elements included in the scattering tomography device respectively correspond to a plurality of polarization directions of the radio waves, and
the plurality of receiving antenna elements included in the scattering tomography device respectively correspond to the plurality of polarization directions of the radio waves.

14. The scattering tomography device according to claim 1,
wherein the one or more parameters are defined by measuring a plurality of dielectric constants of an object of a same type as the object, relative to a plurality of frequencies of the radio waves.

15. The scattering tomography device according to claim 1,
wherein the radio waves are pulsed waves.

16. A scattering tomography method comprising:
transmitting, by a transmitting antenna element, radio waves into an interior of an object from outside the object;
receiving, outside the object, by a receiving antenna element, scattered waves of the radio waves transmitted into the interior of the object; and
generating an image of the interior of the object using measurement data indicating the scattered waves received by the receiving antenna element,
wherein the generating includes:
deriving, using the measurement data, a relational expression that satisfies an equation whose solution is a scattering field function that takes a transmission position of the radio waves and a reception position of the scattered waves as inputs and outputs an amount of the scattered waves at the reception position;
deriving, using the relational expression, an image function that is for generating the image and includes one or more parameters indicating a correspondence between a change in frequency of the radio waves and a change in a dielectric constant of the object in accordance with Debye relaxation; and
generating the image using the image function.

* * * * *